US010356653B2

(12) United States Patent
Singh et al.

(10) Patent No.: US 10,356,653 B2
(45) Date of Patent: Jul. 16, 2019

(54) MULTI-USER BASED SPLITTING FOR MULTI-RAT AGGREGATION

(71) Applicant: Intel Corporation, Santa Clara, CA (US)

(72) Inventors: Sarabjot Singh, Santa Clara, CA (US); Nageen Himayat, Fremont, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/742,878

(22) PCT Filed: Dec. 14, 2015

(86) PCT No.: PCT/US2015/065529
§ 371 (c)(1),
(2) Date: Jan. 8, 2018

(87) PCT Pub. No.: WO2017/027053
PCT Pub. Date: Feb. 16, 2017

(65) Prior Publication Data
US 2018/0376366 A1  Dec. 27, 2018

Related U.S. Application Data

(60) Provisional application No. 62/202,676, filed on Aug. 7, 2015.

(51) Int. Cl.
*H04W 28/02* (2009.01)
*H04W 24/10* (2009.01)
(Continued)

(52) U.S. Cl.
CPC ....... *H04W 28/0252* (2013.01); *H04W 16/14* (2013.01); *H04W 24/10* (2013.01);
(Continued)

(58) Field of Classification Search
CPC ........... H04W 72/0486; H04W 28/085; H04W 76/15; H04W 88/12; H04W 72/0433; H04W 28/08; H04W 72/04
(Continued)

(56) References Cited

U.S. PATENT DOCUMENTS 9,722,743 B2 *  8/2017  Li ..................... H04W 28/08
9,736,717 B2 *  8/2017  Zhou ................. H04W 28/08
(Continued)

FOREIGN PATENT DOCUMENTS

| CN | 107852635 A | 3/2018 |
|---|---|---|
| WO | 2015/002466 A2 | 1/2015 |
| WO | 2017/027053 A1 | 2/2017 |

OTHER PUBLICATIONS

International Search Report and Written Opinion received for International Application No. PCT/US2015/065529, dated May 4, 2016, 15 pages.
(Continued)

*Primary Examiner* — Man U Phan
(74) *Attorney, Agent, or Firm* — Jaffery, Watson, Mendonsa & Hamilton LLP

(57) ABSTRACT

Apparatus, systems, and methods to identify victims and aggressors of interference in full duplex communication systems are described. In one example, apparatus of an eNB capable to manage a bearer in a network comprising multiple heterogeneous radio access technology network access points, the eNB comprising processing circuitry to determine a first portion of the bearer to be allocated to a first network access point and a second portion of the bearer to be allocated to a second network access point in the network and allocate the first portion of the bearer to the first network
(Continued)

access point and the second portion of the bearer to the second network access point. Other examples are also disclosed and claimed.

17 Claims, 18 Drawing Sheets

(51) Int. Cl.
*H04W 88/08* (2009.01)
*H04W 76/00* (2018.01)
*H04W 16/14* (2009.01)
*H04W 76/27* (2018.01)
*H04W 88/10* (2009.01)
*H04W 80/02* (2009.01)
*H04W 84/12* (2009.01)

(52) U.S. Cl.
CPC .......... *H04W 76/00* (2013.01); *H04W 76/27* (2018.02); *H04W 88/08* (2013.01); *H04W 88/10* (2013.01); *H04W 80/02* (2013.01); *H04W 84/12* (2013.01)

(58) Field of Classification Search
USPC .................................................. 370/235, 329
See application file for complete search history.

(56) References Cited

U.S. PATENT DOCUMENTS

| | | | | |
|---|---|---|---|---|
| 9,788,242 | B2* | 10/2017 | Nuggehalli | H04W 36/0022 |
| 9,838,282 | B2* | 12/2017 | Dudda | H04L 43/062 |
| 10,050,894 | B2* | 8/2018 | Karaki | H04L 47/283 |
| 2015/0071063 | A1 | 3/2015 | Zhou et al. | |
| 2015/0188680 | A1 | 7/2015 | Li et al. | |
| 2016/0338074 | A1* | 11/2016 | Chou | H04W 76/15 |
| 2017/0273125 | A1* | 9/2017 | Teyeb | H04W 36/0027 |
| 2017/0332422 | A1* | 11/2017 | Ohta | H04W 76/11 |
| 2018/0084544 | A1* | 3/2018 | Xu | H04W 28/085 |
| 2018/0206282 | A1* | 7/2018 | Singh | H04W 88/06 |
| 2018/0352477 | A1* | 12/2018 | Singh | H04W 28/085 |

OTHER PUBLICATIONS

Catt "Discussion on Mobility Procedures of Aggregation Bearer", Discussion, May 15, 2015, 5 pages, 3GPPTSG RAN WG2, Fukuoka, Japan.
Interdigital Communications "Bearer Architecture for LTE+WLAN Aggregation in LTE R13", Discussion, May 15, 2015, 4 pages, 3GPPTSG RAN WG2, Fukuoka, Japan.
Notification of Publication of Hong Kong Application No. 1251395A published Jan. 25, 2019.

* cited by examiner

| Bits | | | | | | | | Octets |
|---|---|---|---|---|---|---|---|---|
| 7 | 6 | 5 | 4 | 3 | 2 | 1 | 0 | |
| PDU Type = 1 | | | Spare | | | Final Frame Indicator | Lost Packet Report | 1 |
| Highest Successfully Delivered PDCP Sequence Number | | | | | | | | 2 |
| Desired Buffer Size for the E-RAB | | | | | | | | 4 |
| Highest Successfully Delivered PDCP Sequence Number | | | | | | | | 4 |
| Minimum Desired Buffer Size for the UE | | | | | | | | 1 |
| Number of Lost X2-U Sequence Number Ranges Reported | | | | | | | | |
| Start of Lost X2-U Sequence Number Range | | | | | | | | 4*(Number of Reported Lost X2-uSN Ranges) |
| End of Lost X2-U Sequence Number Range | | | | | | | | |
| Spare Extension | | | | | | | | 0-4 |
| R=UE-WLAN-RATE | | | | | | | | 2 |
| Spare | | | | | | | | 2 |

FIG. 11

| 7 | 6 | 5 | 4 | 3 | 2 | 1 | 0 |
|---|---|---|---|---|---|---|---|
| D/C | \multicolumn{3}{c}{PDU Type} | R | R | R | R |
| R | \multicolumn{7}{c}{FMS} |
| \multicolumn{8}{c}{Bitmap 1 (Optional)} |

| Bitmap N (Optional) |
|---|

| WLAN Control Packet Type |
|---|
| Data 1 |
| Data 2 |
| Data 2 |

MULTI-USER BASED SPLITTING FOR MULTI-RAT AGGREGATION

RELATED APPLICATIONS

This application claims the benefit of priority under 35 U.S.C. § 371 to International Application No. PCT/US2015/065529 filed Dec. 14, 2015, entitled MULTI-USER BASED SPLITTING FOR MULTI-RAT AGGREGATION which in turn claims the benefit of priority under 35 U.S.C. § 119(e) of U.S. Provisional Application Ser. No. 62/202,676, filed Aug. 7, 2015, entitled MULTI-USER BASED SPLITTING FOR MULTI-RAT AGGREGATION (MUS), the disclosures of which are incorporated herein by reference in their entirety.

FIELD

The present disclosure generally relates to the field of electronic communication. More particularly, aspects generally relate to multi-user based splitting for multiple radio access technology (multi-RAT) aggregation in communication systems.

BACKGROUND

Techniques to enable multi-user based bearer splitting for multiple radio access technology aggregation may find utility, e.g., in electronic communication systems for electronic devices.

BRIEF DESCRIPTION OF THE DRAWINGS

The detailed description is provided with reference to the accompanying figures. The use of the same reference numbers in different figures indicates similar or identical items.

FIG. 11 is a schematic illustration of a delivery status block which may be used in a method for multi-user based splitting for multiple radio access technology (multi-RAT) aggregation in accordance with various examples discussed herein.

Figure 1A:
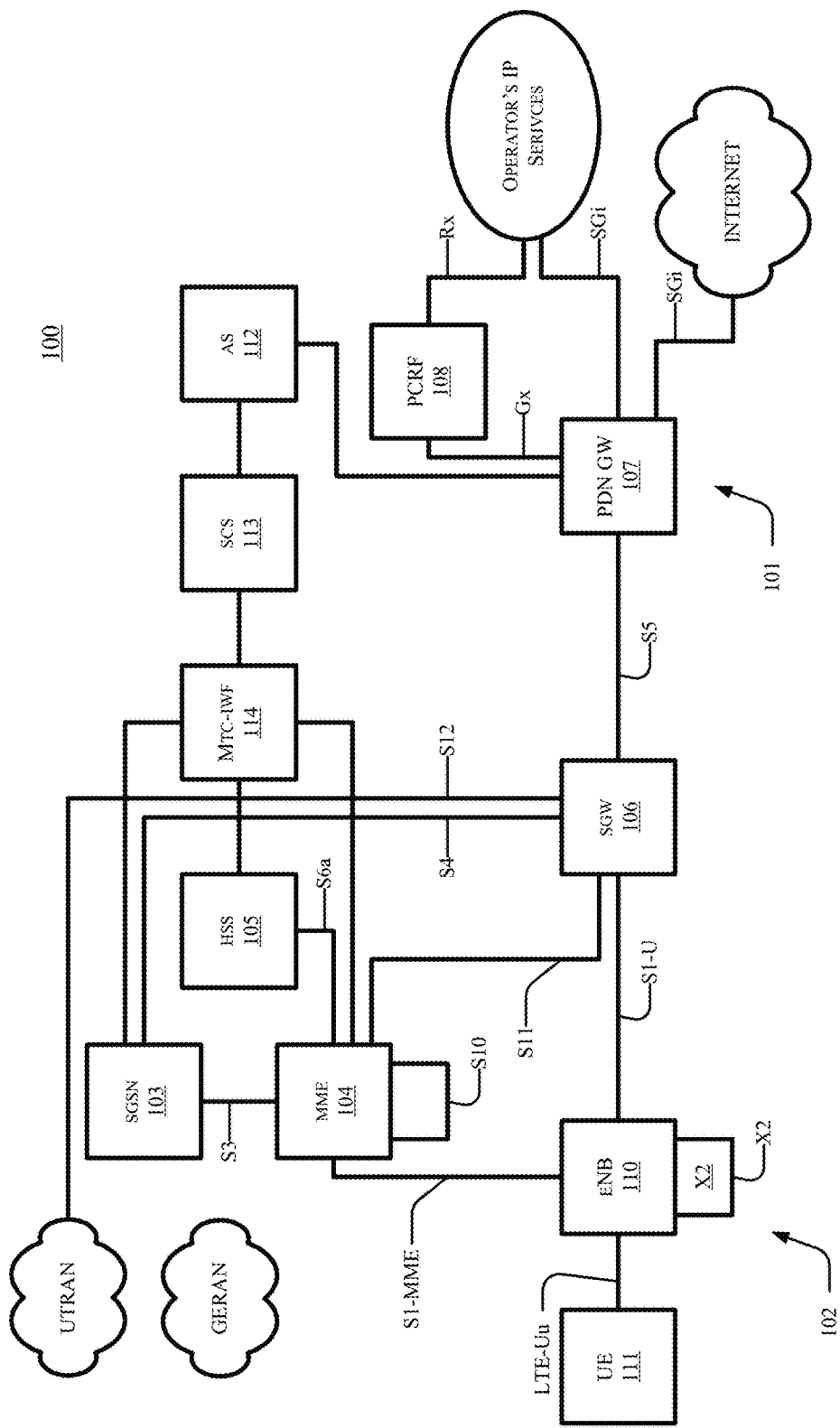
FIG. 1A is a schematic, block diagram illustration of components in a 3GPP LTE network which may implement multi-user based splitting for multiple radio access technology (multi-RAT) aggregation in accordance with various examples discussed herein.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following description, numerous specific details are set forth in order to provide a thorough understanding of various examples. However, various examples may be practiced without the specific details. In other instances, well-known methods, procedures, components, and circuits have not been described in detail so as not to obscure the particular examples. Further, various aspects of examples may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments.

Various operations may be described as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

As described in brief above, techniques to enable multi-user based bearer splitting for multiple radio access technology aggregation may find utility, e.g., in electronic communication systems for electronic devices. Subject matter described herein addresses these and other issues by providing techniques to split traffic dynamically across multiple radio access technology platforms and multiple users. In some aspects the techniques described herein provide for fairness between users associated with a given anchor base station (i.e., eNB). Some algorithms described herein are based on minimizing the sum of logarithms of delays across all users, which facilitates fair bandwidth allocations between users of an eNB. Various techniques described herein require only minimal exchange of information related to the state of the wireless local area network (WLAN) radio access technology (RAT), making them especially amenable to implementation with non-collocated WLAN/LTE deployments.

A first example algorithm may require an upgrade to the WLAN AP (access point) to incorporate a control interface between the WLAN AP and the eNB. A second algorithm does not require an upgrade to the existing WLAN APs. While the proposed approach is described in the context of aggregation of traffic between LTE access points (e.g., an eNB) and WLAN access points, the algorithm and associated benefits are equally applicable for aggregation across other RATs as well as multiple links across the same RAT (e.g. 5G, mm-wave RAT, WiGiG, dual connectivity link across licensed and un-licensed band, multi-channel aggregation, and across more than one RAT, etc.).

In some examples the bearer splitting algorithms may be dynamic and allow bearer splitting allocations between access points to be made on real-time measurements accounting for link quality, congestion, propagation delays, and traffic requirements for each user across LTE and WLAN access points. The algorithms may also account for changes in backhaul delay between various radio links and is robust to non ideal delays. Further, in some examples the algorithms may also be capable of automatically falling back to a non-bearer split mode of operation depending on the dynamic link quality across various radio links. The algorithms may also selectively turn off bearer splitting for bearers/users which are not expected to benefit substantially from the bearer splitting.

Additional features and characteristics these techniques and communication systems in which the techniques may be incorporated are described below with reference to FIGS. 1A-19.

FIG. 1A shows an exemplary block diagram of the overall architecture of a 3GPP LTE network 100 that includes one or more devices that are capable of implementing methods for multi-user based splitting for multiple radio access technology (multi-RAT) aggregation according to the subject matter disclosed herein. FIG. 1A also generally shows exemplary network elements and exemplary standardized interfaces. At a high level, network 100 comprises a core network (CN) 101 (also referred to as an evolved Packet System (EPC)), and an air-interface access network E UTRAN 102. CN 101 is responsible for the overall control of the various User Equipment (UE) connected to the network and establishment of the bearers. CN 101 may include functional entities, such as a home agent and/or an ANDSF server or entity, although not explicitly depicted. E UTRAN 102 is responsible for all radio-related functions.

The main exemplary logical nodes of CN 101 include, but are not limited to, a Serving GPRS Support Node 103, the Mobility Management Entity 104, a Home Subscriber Server (HSS) 105, a Serving Gate (SGW) 106, a PDN Gateway 107 and a Policy and Charging Rules Function (PCRF) Manager 108. The functionality of each of the network elements of CN 101 is well known and is not described herein. Each of the network elements of CN 101 are interconnected by well-known exemplary standardized interfaces, some of which are indicated in FIG. 1A, such as interfaces S3, S4, S5, etc., although not described herein.

While CN 101 includes many logical nodes, the E UTRAN access network 102 is formed by at least one node, such as evolved NodeB (base station (BS), eNB or eNodeB) 110, which connects to one or more User Equipment (UE) 111, of which only one is depicted in FIG. 1A. UE 111 is also referred to herein as a wireless device (WD) and/or a subscriber station (SS), and can include an M2M-type device. In one example, UE 111 may be coupled to eNB by an LTE-Uu interface. In one exemplary configuration, a single cell of an E UTRAN access network 102 provides one substantially localized geographical transmission point (having multiple antenna devices) that provides access to one or more UEs. In another exemplary configuration, a single cell of an E UTRAN access network 102 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there is no centralized controller in E-UTRAN; hence the E-UTRAN architecture is said to be flat. The eNBs are normally interconnected with each other by an interface known as "X2" and to the EPC by an S1 interface. More specifically, an eNB is connected to MME 104 by an S1 MME interface and to SGW 106 by an S1 U interface. The protocols that run between the eNBs and the UEs are generally referred to as the "AS protocols." Details of the various interfaces are well known and not described herein.

The eNB 110 hosts the PHYsical (PHY), Medium Access Control (MAC), Radio Link Control (RLC), and Packet Data Control Protocol (PDCP) layers, which are not shown in FIG. 1A, and which include the functionality of user-plane header-compression and encryption. The eNB 110 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DL/UL user plane packet headers.

The RRC layer in eNB 110 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 111, generates pages for UEs 111 over the air, broadcasts system information, controls UE measurement reporting, such as the periodicity of Channel Quality Information (CQI) reports, and allocates cell-level temporary identifiers to active UEs 111. The RRC layer also executes transfer of UE context from a source eNB to a target eNB during handover, and provides integrity protection for RRC messages. Additionally, the RRC layer is responsible for the setting up and maintenance of radio bearers.

Figure 1B:
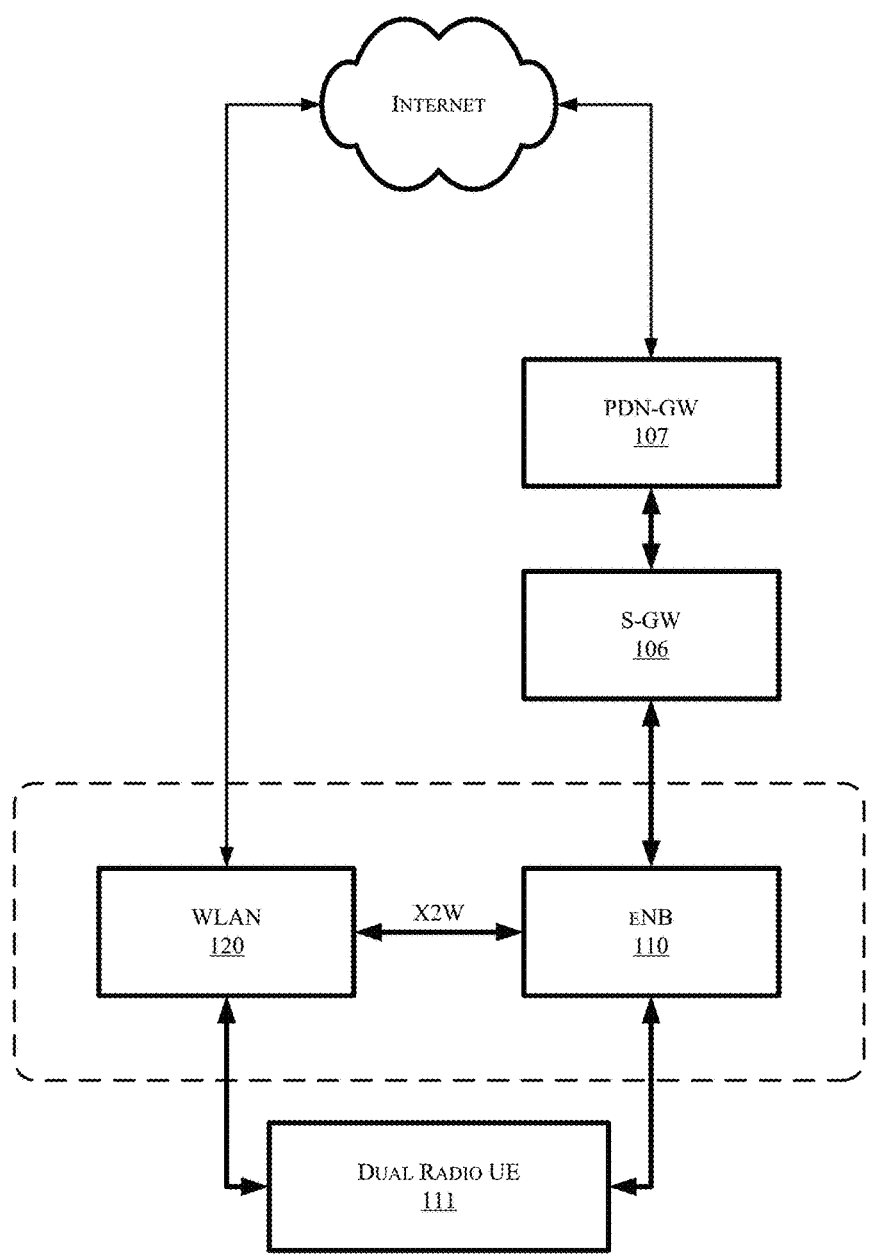
FIG. 1B is a schematic, block diagram illustration of components in a network architecture for multi-user based splitting for multiple radio access technology (multi-RAT) aggregation in accordance with various examples discussed herein.

FIG. 1B is a schematic, block diagram illustration of components in a network architecture for multi-user based splitting for multiple radio access technology (multi-RAT) aggregation in accordance with various examples discussed herein. Referring to FIG. 1B, in some examples a dual radio user equipment (UE) 111 may obtain access to a network such as the internet through multiple network radio access technologies (RATs). In the example depicted in FIG. 1B, UE 111 may access a network through one or both of a WLAN access point 120 or a cellular access point such as an such as evolved NodeB (base station (BS), eNB or eNodeB) 110, which in turn may be communicatively coupled to a serving gateway (S-GW 106) and a PDN Gateway (PDN-GW) 107.

Figure 2:
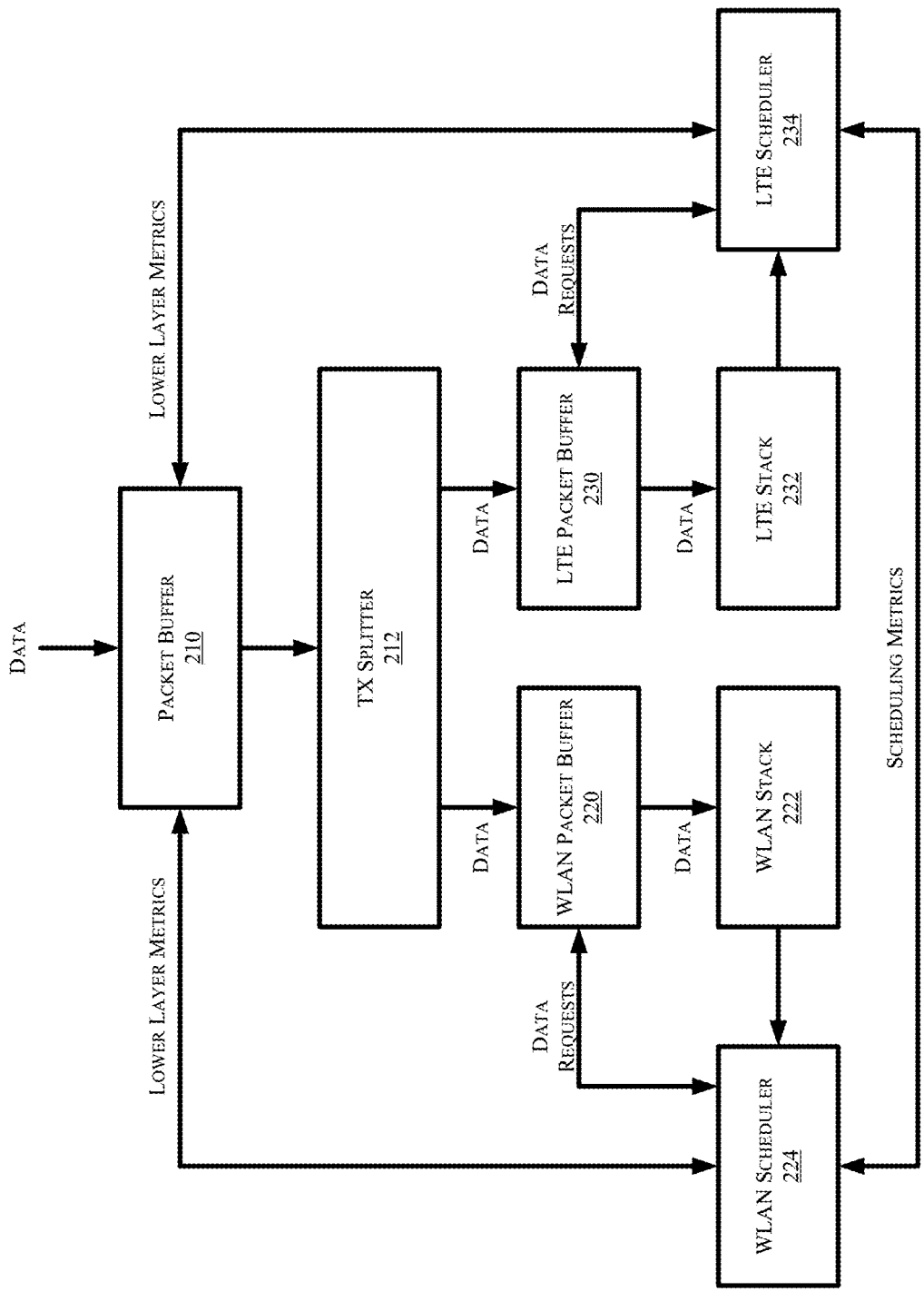
FIG. 2 is a schematic, block diagram illustration of a data architecture for multi-user based splitting for multiple radio access technology (multi-RAT) aggregation in accordance with various examples discussed herein.

Described herein are techniques to split bearer traffic for UE 111 between WLAN access point 120 and eNB access point 110 FIG. 2 is a schematic, block diagram illustration of a data architecture for multi-user based splitting for multiple radio access technology (multi-RAT) aggregation in accordance with various examples discussed herein. Referring to FIG. 2, in some examples communication data is buffered in a packet buffer 210, then provided to a transmission splitter 212, which splits the data between a WLAN packet buffer 220 and an LTE packet buffer 230. The data in the WLAN packet buffer is managed by a WLAN protocol stack 222, while the data in the LTE packet buffer is managed by an LTE protocol stack 232.

A WLAN scheduler 224 schedules the data being transmitted via the WLAN access point 120, while an LTE scheduler 234 schedules the data being transmitted via the LTE access point 130. WLAN scheduler 224 and LTE scheduler 234 may communicate to share scheduling metrics. Further, WLAN scheduler 234 and WLAN packet buffer 220 may exchange data requests. Similarly, LTE scheduler 234 and LTE packet buffer 230 may exchange data request.

Figure 3:
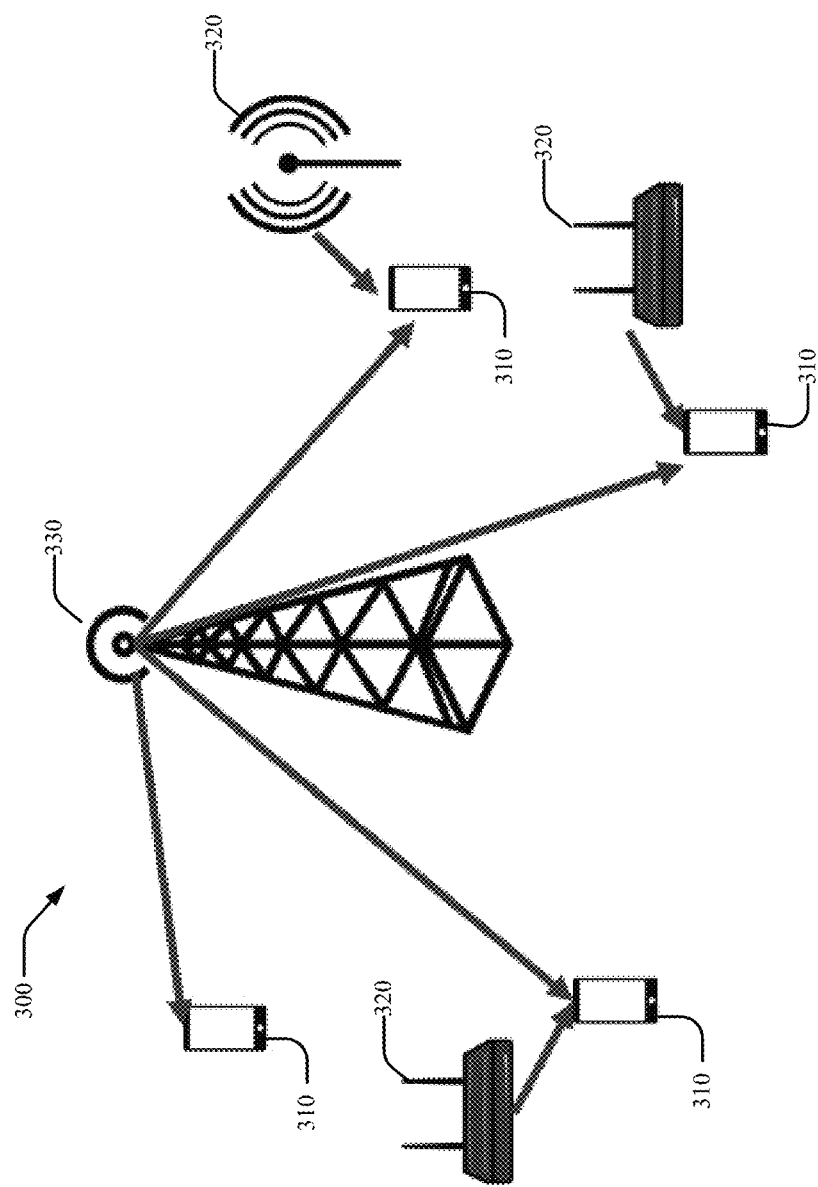
FIG. 3 is a schematic illustration of a network architecture for multi-user based splitting for multiple radio access technology (multi-RAT) aggregation in accordance with various examples discussed herein.

FIG. 3 is a schematic illustration of a network architecture for a communication system 300 for multi-user based splitting for multiple radio access technology (multi-RAT) aggregation in accordance with various examples discussed herein. System 300 may comprise one or more cells, each of which may comprise one or more sectors. Each cell comprises at least one base station (BS) 330. A plurality of UEs 310 may be located throughout system 300. System 300 may further include one or more access points 320 which may transport traffic from UEs 310 to a communication network.

A base station 310 can be embodied as, but is not limited to, an evolved NodeB (eNB or eNodeB), a macro-cell base station, a pico-cell base station, a femto-cell base station, or the like. A UE 320 can embodied as, but is not limited to, a mobile station (MS), a subscriber station (SS), a Machine-to-Machine-type (M2M-type) device, customer premises equipment (CPE), a User Equipment (UE), a notebook-type computer, a tablet-type device, a cellular telephone, a smart-type device, a smartphone, a personal digital assistant, an information-handling system, or the like as described herein. Access points 320 may be embodied as, but not limited to, WLAN access points.

Figure 4:
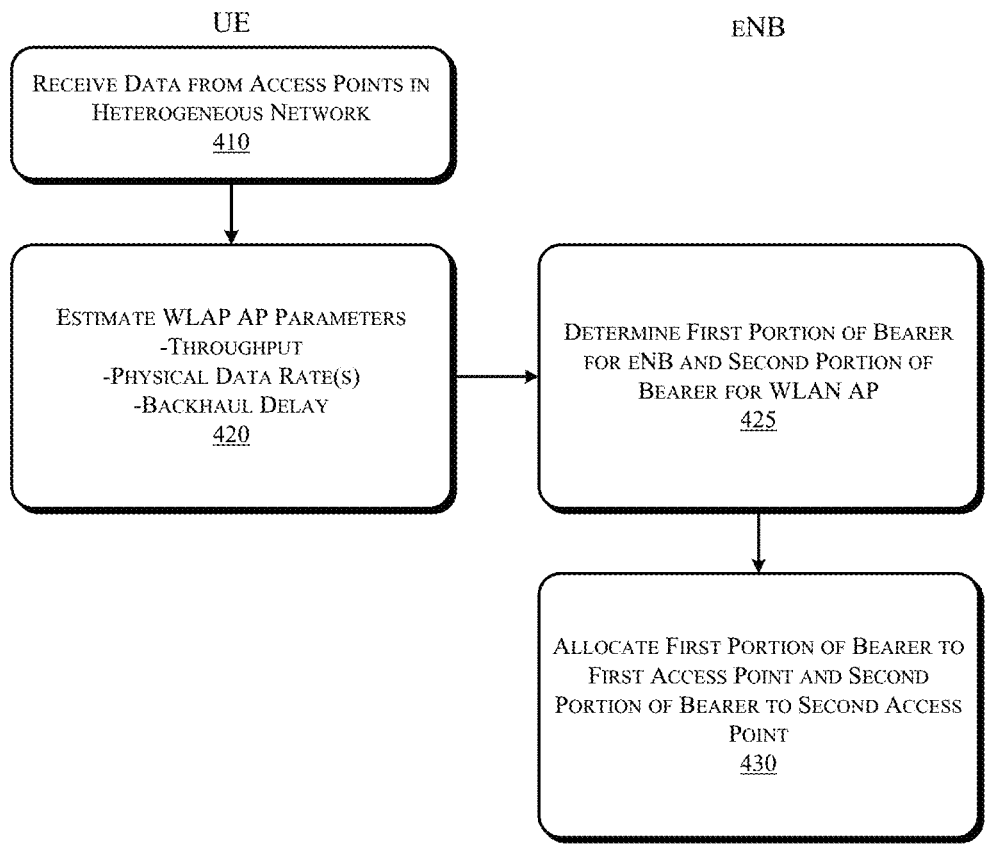
FIG. 4 is a flowchart illustrating high-level operations in a method for multi-user based splitting for multiple radio access technology (multi-RAT) aggregation in accordance with various examples discussed herein.

Described herein are techniques for bearer splitting which may be implemented in 3GPP LWA operation and associated signaling flows over the Xw (i.e., eNB to WLAN Termination point) or the Uu (UE to eNB). FIG. 4 is a flowchart illustrating high-level operations in a method for multi-user based splitting for multiple radio access technology (multi-RAT) aggregation in accordance with various examples discussed herein.

Referring to FIG. 4, at operation 410 a UE receives data from multiple access points in a heterogeneous network. In the example depicted in FIG. 3 a UE 310 may receive data from the eNB 330 and/or one or more WLAN access points 320. At operation 420 a UE estimates a throughput on the WLAN access point 320, the PHY rate of the eNB 330, and a backhaul delay for the network. These parameters may be forwarded to the eNB, either by the UE or by the WLAN access point 320, e.g., over an Xw interface between the WLAN access point 320 and the eNB using a GTP-U protocol and/or an X2AP protocol. In some examples the Xw-AP protocol can provide additional WLAN parameters such as WLAN load, WLAN STA count (i.e., number UEs associated with WLAN), WLAN data Rate, WLAN Average access delay. It is possible for the eNB to generate an estimate of WLAN throughput using these parameters. For example, the eNB may estimate the WLAN data rate by the average access delay and divide this by the number of users associated with the WLAN AP. Alternately this information can come from the UE as already captured.

The eNB receives the parameter and, at operation 425 the eNB determines a first portion of a bearer to be allocated to a first network access point (e.g., the eNB) and a second portion of the bearer to be allocated to a second network access point (e.g., the WLAN access point 320). At operation 430 the eNB allocates the first portion of the bearer to the first network access point (e.g., the eNB) and the second portion of the bearer to the second network access point (e.g., the WLAN access point 320).

In some examples the bearer splitting algorithm implemented by the eNB at operation 425 minimizes a sum of the logarithms of delay across all UEs, or by maximizing the sum of the logarithms of throughput across all the UEs in the network. The sum log throughput is an example of a proportional fair metric.

One example algorithm seeks to obtain an acceptable ratio of traffic split across multiple RATs for each user by solving a convex optimization problem in a closed form solution. The algorithm dynamically tunes the ratio of traffic sent over each link for each user based on (a) a throughput of active UEs on their respective WLAN AP (e.g. $R_k$ for UE k); (b)

Physical layer data rates of UEs on the eNodeB (e.g. Ck for UE k); and (c) eNB-WLAN backhaul delay (D). These metrics may be sent directly to the eNB from the respective APs or sent by the UEs over the LTE link.

Using these metrics, the algorithm determines a suitable fraction of resources to be allocated to each user on the LTE link, called pk. An optimal splitting ratio may be obtained in the ratio of the subsequent throughput ratios, i.e. pkCk:Rk. The protocol operation is illustrated in the FIG. 7 with two APs anchored at the eNB for traffic splitting among the associated users.

In the example depicted in FIG. 3 multiple small cells (i.e., booster cells) served by access points 320 which operate in orthogonal bands/RATs overlaid within an anchor base station's 330 coverage area. The anchor base station 330 serves UEs 310 associated with it and the UEs 310 associated with the booster cells served by access points 320. Each UE 310 has access to at most one booster small cell which may be determined by an association metric e.g. RSRP, RSRQ etc. UEs 310 simultaneously served by a small cell and anchor base station 330 aggregate traffic and the traffic may be split across the booster and anchor cell, as depicted in FIG. 1B.

In the event that there are K active UEs 310 per sector, for a specific UE k, the throughput on small cell may be designated as Rk, the PHY rate on anchor base station 330 (or eNodeB) may be designated as Ck, and the fraction of resources allocated to the anchor base station 330 may be designated as pk. The total throughput of user k is thus given by the sum of individual throughput Rk+pk*Ck.

The objective is to determine the allocation, p, that maximizes the sum log rate of all UEs in the cell:

$$\max \sum_{k=1}^{K} \log(Rk + pkCk) \qquad \text{EQ 1}$$

subject to the criteria that $$\sum_{k=1}^{K} \log pk = 1 \qquad \text{EQ 2}$$

Figure 5:
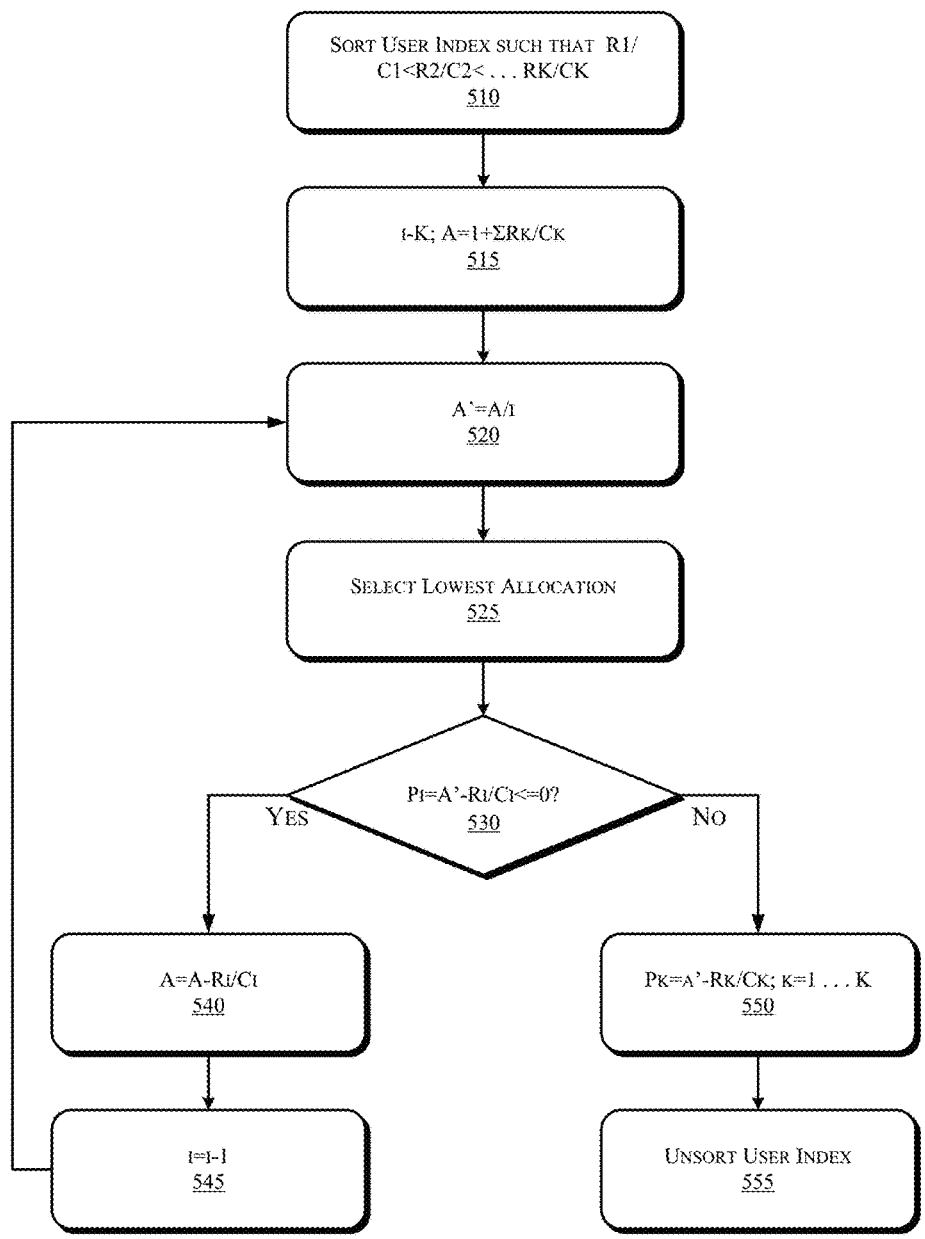
FIG. 5 is a flowchart illustrating operations in a method for multi-user based splitting for multiple radio access technology (multi-RAT) aggregation in accordance with various examples discussed herein.

This can be solved using a water filling based algorithm as shown below with reference to FIG. 5 and FIG. 6. KKT conditions lead to pk+Rk/Ck=constant. Thus, Σpk+Rk/Ck=A (which is constant). FIG. 5 is a flowchart illustrating high-level operations in a method for multi-user based splitting for multiple radio access technology (multi-RAT) aggregation in accordance with various examples discussed herein. In some examples the operations depicted in FIG. 5 may be implemented by a controller, e.g., in the anchor base station 330.

Figure 6:
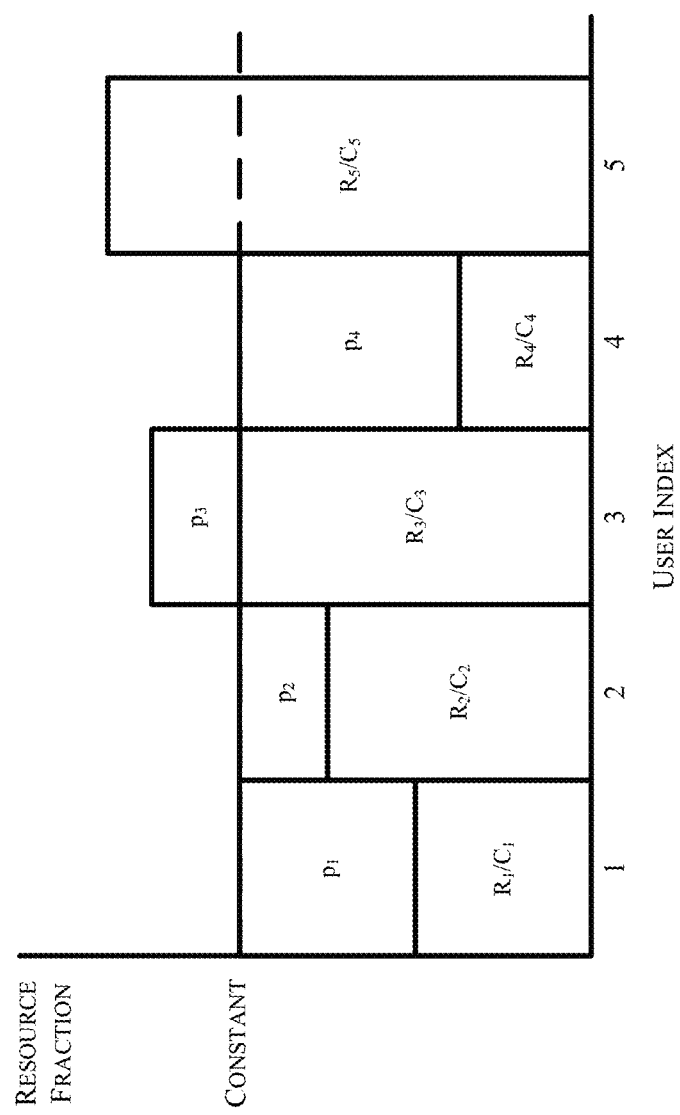
FIG. 6 is a schematic diagram illustrating resource allocation in a method for multi-user based splitting for multiple radio access technology (multi-RAT) aggregation in accordance with various examples discussed herein.

Referring to FIGS. 5-6, at operation 510 an index of K users (e.g., UEs) serviced by the anchor base station 330 is sorted in an ascending order of throughput on the access point 320 (Rk) divided by the physical rate (PHY) on the anchor base station 330, i.e., such that R1/C1<R2/C2< . . . Rk/Ck. At operation 515 a counter (i) is set equal to the number (K) of users serviced by the anchor base station 330, and the constant A is set to Σ1+Rk/Ck. At operation 520 A' is set to A/i.

At operation 525 the lowest allocation is selected. If, at operation 530 the allocation pi=A'-Ri/Ci is less than or equal to zero then control passes to operation 540 and the constant A is set to A-Ri/Ci. The counter i is decremented at operation 545 and control passes back to operation 520. Thus, operations 520-545 define a loop pursuant to which the optimal value for the constant A' (and hence pk) is determined.

By contrast, if at operation 530 the allocation pi=A'-Ri/Ci is not less than or equal to zero then control passes to operation 550 and the allocation Pk is determined as A'-Rk/Ck for all K users serviced by the anchor base station 330. At operation 555 the user index may be unsorted.

After computing of the optimal pk's, the ratio of the portion sent on LTE to that on the WLAN for UE k is given by pkCk:rk.

FIG. 6 is a schematic diagram illustrating resource allocation in a method for multi-user based splitting for multiple radio access technology (multi-RAT) aggregation in accordance with various examples discussed herein. As illustrated in FIG. 6, the operations depicted in FIG. 5 allocate the resource pk in a manner which is inversely proportional to the fraction Rk/Ck, implying that higher fraction of resources are allocated to UEs with high PHY rates at the anchor base station 330 and lower data throughput rates on their respective access points 320. Further, the UEs associated with user index 3 and user index 5 are not allocated any resources on the anchor base station 330 as the corresponding ratio of data throughput on their respective access points 320 and LTE capacity is too high to be supported in the current load scenario.

In order to accommodate a non-ideal WLAN backhaul with latency of D (ms), the above optimization may be operated with a modified throughput estimate on WLAN given by:

$$R_{eff,k}=(1/R_k D/F)^{\wedge}(-1), \qquad \text{EQ 3:}$$

where F is the file size of the UE over which the delay is being minimized.

Figure 7:
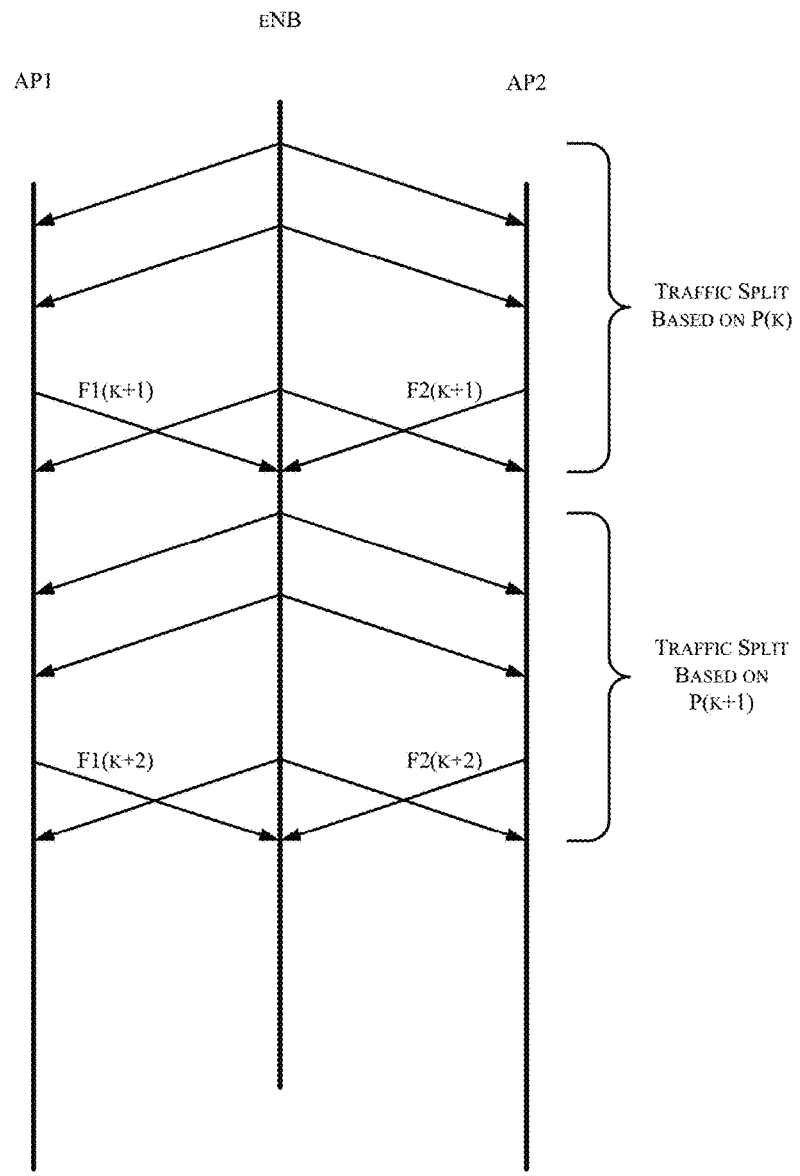
FIGS. 7 and 8 are schematic illustrations of feedback flows in a method in a method for multi-user based splitting for multiple radio access technology (multi-RAT) aggregation in accordance with various examples discussed herein.
Figure 8:
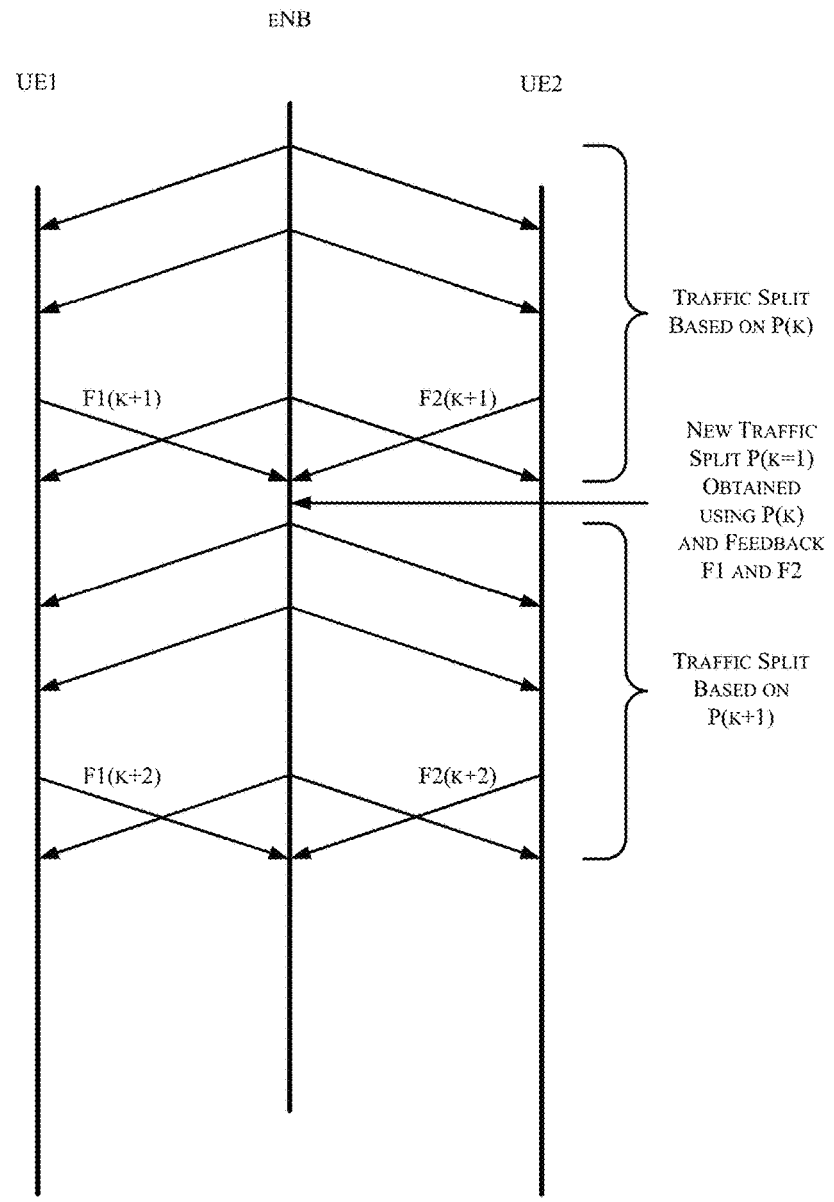

FIGS. 7 and 8 are schematic illustrations of feedback flows in a method in a method for multi-user based splitting for multiple radio access technology (multi-RAT) aggregation in accordance with various examples discussed herein. As illustrated in FIG. 7, in some examples an eNB may apportion traffic between one or more access points, AP1 and AP2, for a first period of time based on a first apportion parameter P(k). During the first period of time the eNB may receive feedback from the access points AP1 and AP2, e.g., via a Xw interface using at least one of a GTP-U protocol or a X2AP protocol. Based on the feedback the eNB may determine a new apportion parameter P(k+1), which is used to apportion traffic between access points AP1 and AP2 during a second time period. This process may continue, such that a bearer is apportioned dynamically over time based on feedback parameters as described above. FIG. 8 illustrates a similar example, but in the example depicted in FIG. 8 the feedback is provided directly from the UEs to the eNB.

Figure 9:
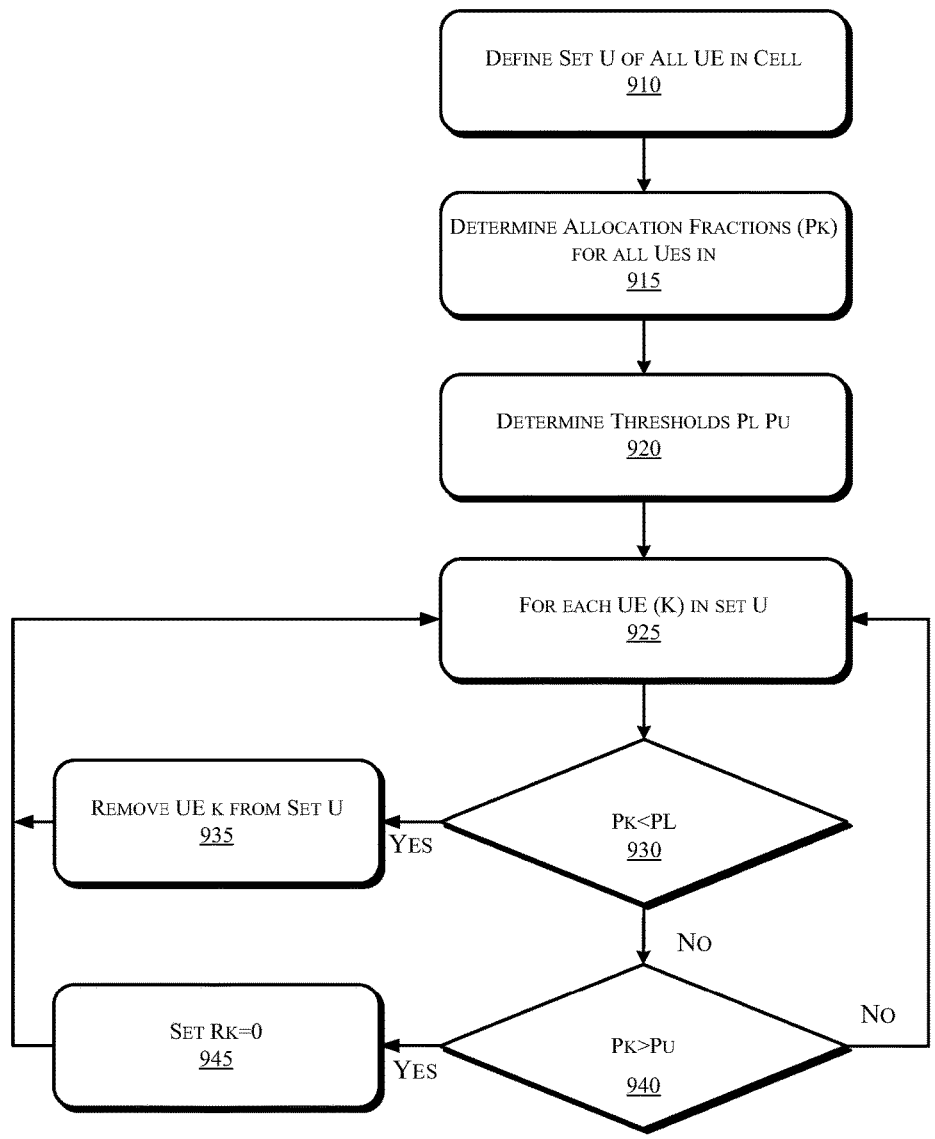
FIG. 9 is a flowchart illustrating operations in a method for multi-user based splitting for multiple radio access technology (multi-RAT) aggregation in accordance with various examples discussed herein.

In some examples the eNB may be configured to deactivate bearer splitting for a UE when the splitting ratios are skewed in favor of either the eNB or one or more small cell access points such as WLAN access points 320 depicted in FIG. 3. Operations to selectively deactivate bearer splitting for a UE are depicted in FIG. 9. Referring to FIG. 9, at operation 910 a set, U, of all UEs in a cell is defined. At operation 915 the respective allocation fractions Pk for the UEs in the cell are determined, e.g., using the method depicted in FIG. 5. At operation 920 a lower threshold $P_L$ for traffic on the eNB is determined and an upper threshold $P_U$ for traffic on the eNB. In some examples the respective thresholds may be a fixed, static threshold. In other examples the thresholds maybe be set dynamically as a function of one or more operational parameters, e.g., network capacity or utilization in a cell, traffic flows, signal strength, etc.

Operations 925-945 define a loop pursuant to which the allocation fractions, Pk, for each UE in the set U are compared to the respective thresholds. Thus, for each UE k in the set U of UEs, at operation 930 the allocation fraction Pk is compared to the lower threshold $P_L$, and if Pk is less than $P_L$ then control passes to operation 935 and the UE k is removed from the set U of UEs assigned to the cell. Thus, all traffic from the UE will be routed through the WLAN access point.

By contrast, if at operation 930 Pk is not less than $P_L$ then control passes to operation 940 and Pk is compared to the upper threshold $P_U$, and if Pk is less than $P_U$ then control passes to operation 945 and the throughput on the WLAN access point (Rk) for the UE k is set to zero. Thus, all traffic from the UE will be routed through the eNB.

Figure 10A:
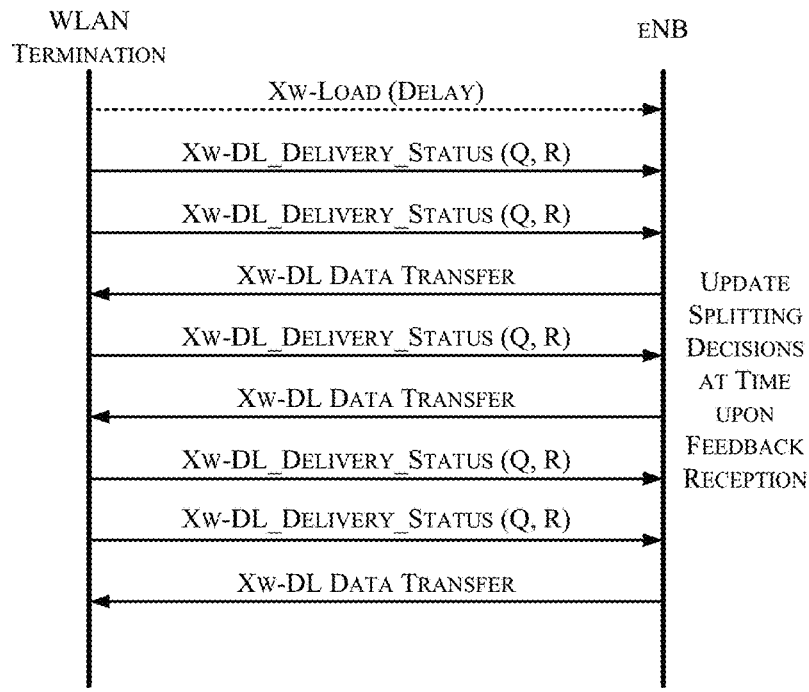
FIGS. 10A and 10B are schematic illustrations of call flows in a method for multi-user based splitting for multiple radio access technology (multi-RAT) aggregation in accordance with various examples discussed herein.
Figure 10B:
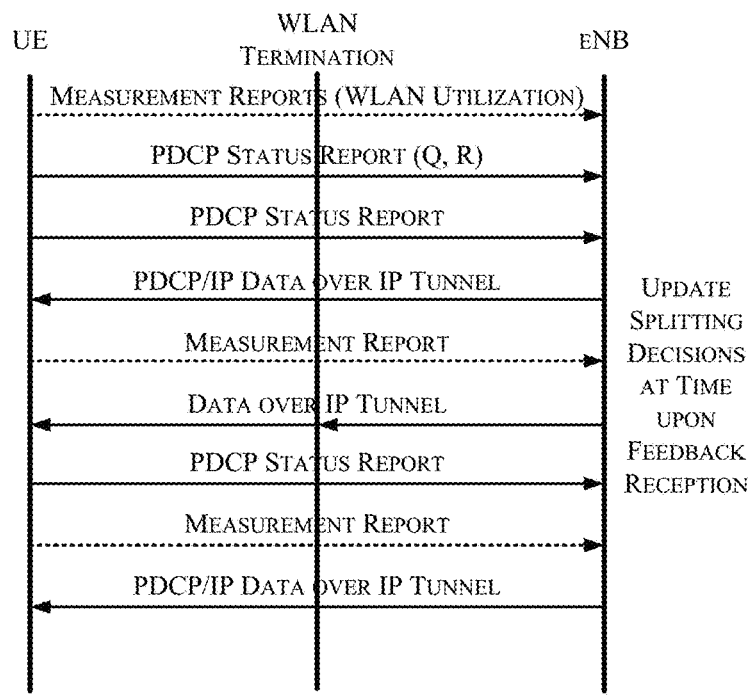

FIGS. 10A and 10B are schematic illustrations of call flows in a method in a method for multi-user based splitting for multiple radio access technology (multi-RAT) aggregation in accordance with various examples discussed herein. FIG. 10 A depicts call flows for exchanging feedback information between eNB and WLAN Termination point assuming a Xw interface based on GTP-U and X2AP extensions for dual connectivity. FIG. 10B depicts call flows for exchanging the feedback information between eNB and UE on the Uu control link.

An example of a modification to support the feedback information in the Xw-Delivery-Status information is illustrated in FIG. 11. Other extensions such as different sizes for the feedback information, etc., may also be supported. Similarly a procedure to estimate the feedback delay over the X2 link (exchange of control packets with time stamps or an ACK/NACK protocol to estimate round-trip-delay etc.) may be implemented. This information can be exchanged via Xw-Load messages and does not need to be reported as frequently as the feedback on queue states and user data rates. If the Xw interface is not available, then either the backhaul delay is configured via OAM or can be addressed by considering the end-to-end delay between the eNB and UE, via suitable signaling.

Figures 12, 13:
FIG. 12 is a schematic illustration of a PDCP status report which may be used in a method for multi-user based splitting for multiple radio access technology (multi-RAT) aggregation in accordance with various examples discussed herein.
FIG. 13 is a schematic illustration of a PDCP WLAN control packet which may be used in a method for multi-user based splitting for multiple radio access technology (multi-RAT) aggregation in accordance with various examples discussed herein.

Examples of modifications to the PDCP status report to include proposed feedback information elements within the PDCP status report and is shown in FIGS. 12 and 13. Additional formats may be supported. For example the PDCP status report may directly be extended to include the required feedback information.

Figure 14:
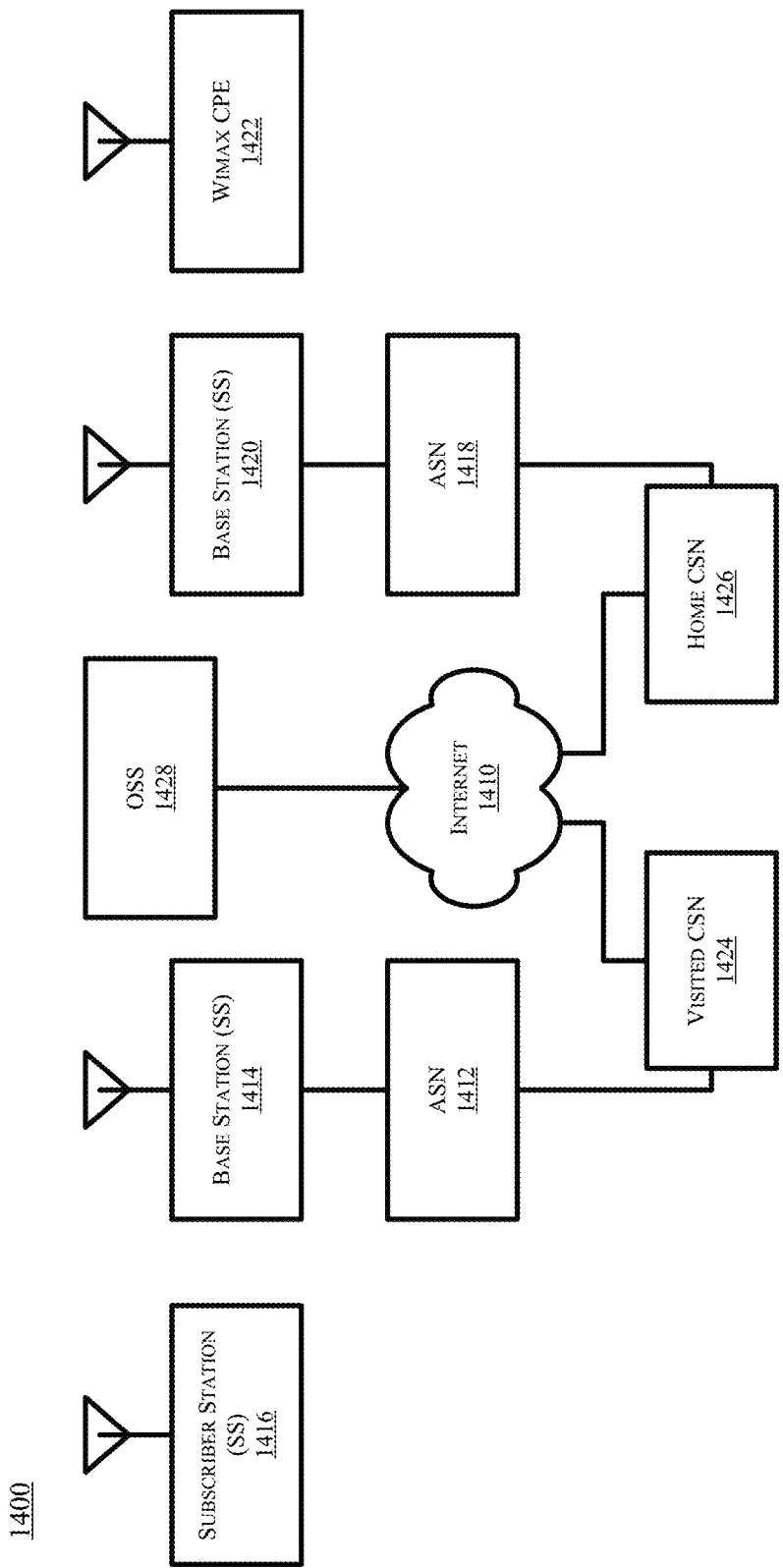
FIG. 14 is a schematic, block diagram illustration of a wireless network in accordance with one or more exemplary embodiments disclosed herein.

FIG. 14 is a schematic, block diagram illustration of a wireless network 1400 in accordance with one or more exemplary embodiments disclosed herein. One or more of the elements of wireless network 1400 may be capable of implementing methods to identify victims and aggressors according to the subject matter disclosed herein. As shown in FIG. 14, network 1400 may be an Internet-Protocol-type (IP-type) network comprising an Internet-type network 1410, or the like, that is capable of supporting mobile wireless access and/or fixed wireless access to Internet 1410.

In one or more examples, network 1400 may operate in compliance with a Worldwide Interoperability for Microwave Access (WiMAX) standard or future generations of WiMAX, and in one particular example may be in compliance with an Institute for Electrical and Electronics Engineers 802.16-based standard (for example, IEEE 802.16e), or an IEEE 802.11-based standard (for example, IEEE 802.11 a/b/g/n standard), and so on. In one or more alternative examples, network 1400 may be in compliance with a 3rd Generation Partnership Project Long Term Evolution (3GPP LTE), a 3GPP2 Air Interface Evolution (3GPP2 AIE) standard and/or a 3GPP LTE-Advanced standard. In general, network 1400 may comprise any type of orthogonal-frequency-division-multiple-access-based (OFDMA-based) wireless network, for example, a WiMAX compliant network, a Wi-Fi Alliance Compliant Network, a digital subscriber-line-type (DSL-type) network, an asymmetric-digital-subscriber-line-type (ADSL-type) network, an Ultra-Wideband (UWB) compliant network, a Wireless Universal Serial Bus (USB) compliant network, a 4th Generation (4G) type network, and so on, and the scope of the claimed subject matter is not limited in these respects.

As an example of mobile wireless access, access service network (ASN) 1412 is capable of coupling with base station (BS) 1414 to provide wireless communication between subscriber station (SS) 1416 (also referred to herein as a wireless terminal) and Internet 1410. In one example, subscriber station 1416 may comprise a mobile-type device or information-handling system capable of wirelessly communicating via network 1400, for example, a notebook-type computer, a cellular telephone, a personal digital assistant, an M2M-type device, or the like. In another example, subscriber station is capable of providing an uplink-transmit-power control technique that reduces interference experienced at other wireless devices according to the subject matter disclosed herein. ASN 1412 may implement profiles that are capable of defining the mapping of network functions to one or more physical entities on network 1400. Base station 1414 may comprise radio equipment to provide radio-frequency (RF) communication with subscriber station 1416, and may comprise, for example, the physical layer (PHY) and media access control (MAC) layer equipment in compliance with an IEEE 802.16e-type standard. Base station 1414 may further comprise an IP backplane to couple to Internet 1410 via ASN 1412, although the scope of the claimed subject matter is not limited in these respects.

Network 1400 may further comprise a visited connectivity service network (CSN) 1424 capable of providing one or more network functions including, but not limited to, proxy and/or relay type functions, for example, authentication, authorization and accounting (AAA) functions, dynamic host configuration protocol (DHCP) functions, or domain-name service controls or the like, domain gateways, such as public switched telephone network (PSTN) gateways or Voice over Internet Protocol (VoIP) gateways, and/or Internet-Protocol-type (IP-type) server functions, or the like. These are, however, merely example of the types of functions that are capable of being provided by visited CSN or home CSN 1426, and the scope of the claimed subject matter is not limited in these respects.

Visited CSN 1424 may be referred to as a visited CSN in the case, for example, in which visited CSN 1424 is not part of the regular service provider of subscriber station 1416, for example, in which subscriber station 1416 is roaming away from its home CSN, such as home CSN 1426, or, for example, in which network 1400 is part of the regular service provider of subscriber station, but in which network 1400 may be in another location or state that is not the main or home location of subscriber station 1416.

In a fixed wireless arrangement, WiMAX-type customer premises equipment (CPE) 1422 may be located in a home or business to provide home or business customer broadband access to Internet 1410 via base station 1420, ASN 1418, and home CSN 1426 in a manner similar to access by subscriber station 1416 via base station 1414, ASN 1412, and visited CSN 1424, a difference being that WiMAX CPE 1422 is generally disposed in a stationary location, although it may be moved to different locations as needed, whereas subscriber station may be utilized at one or more locations if subscriber station 1416 is within range of base station 1414 for example.

It should be noted that CPE 1422 need not necessarily comprise a WiMAX-type terminal, and may comprise other types of terminals or devices compliant with one or more standards or protocols, for example, as discussed herein, and in general may comprise a fixed or a mobile device. Moreover, in one exemplary embodiment, CPE 1422 is capable of providing an uplink-transmit-power control technique that reduces interference experienced at other wireless devices according to the subject matter disclosed herein.

In accordance with one or more examples, operation support system (OSS) 1428 may be part of network 1400 to provide management functions for network 1400 and to provide interfaces between functional entities of network 1400. Network 1400 of FIG. 14 is merely one type of wireless network showing a certain number of the components of network 1400; however, the scope of the claimed subject matter is not limited in these respects.

Figure 15:
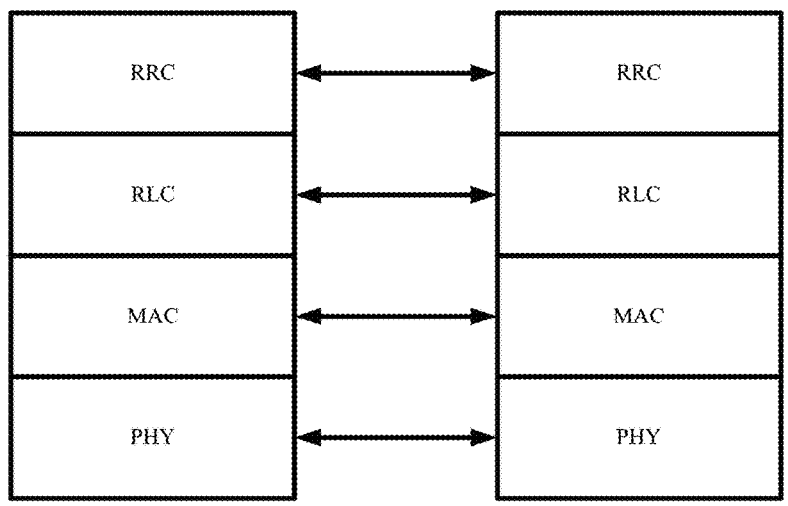
FIGS. 15 and 16 are schematic, block diagram illustrations, respectively, of radio interface protocol structures between a UE and an eNodeB based on a 3GPP-type radio access network standard in accordance with one or more exemplary embodiments disclosed herein.
Figure 16:
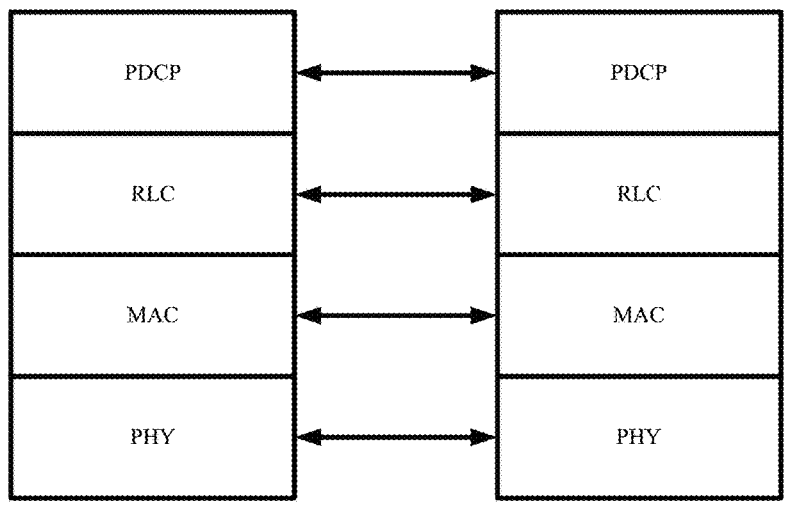

FIGS. 15 and 16 respectively depict exemplary radio interface protocol structures between a UE and an eNodeB that are based on a 3GPP-type radio access network standard and that is capable of providing an uplink-transmit-power control technique that reduces interference experienced at other wireless devices according to the subject matter disclosed herein. More specifically, FIG. 15 depicts individual layers of a radio protocol control plane and FIG. 16 depicts individual layers of a radio protocol user plane. The protocol layers of FIGS. 15 and 16 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets, such as IPv4 or IPv6 packets, in a radio interval with a narrow bandwidth. As a result, only information required for a header part of data can be transmitted, so that transmission efficiency of the radio interval can be increased. In addition, in an LTE-based system, the PDCP layer performs a security function that includes a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C plane, and the DRB is used as a transmission passage of user data in the U plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HARQ) ACK or NACK Scheduling Request (SR) and Channel Quality Indicator (CQI) report information, received from first and second layers (L1 and L2).

Figure 17:
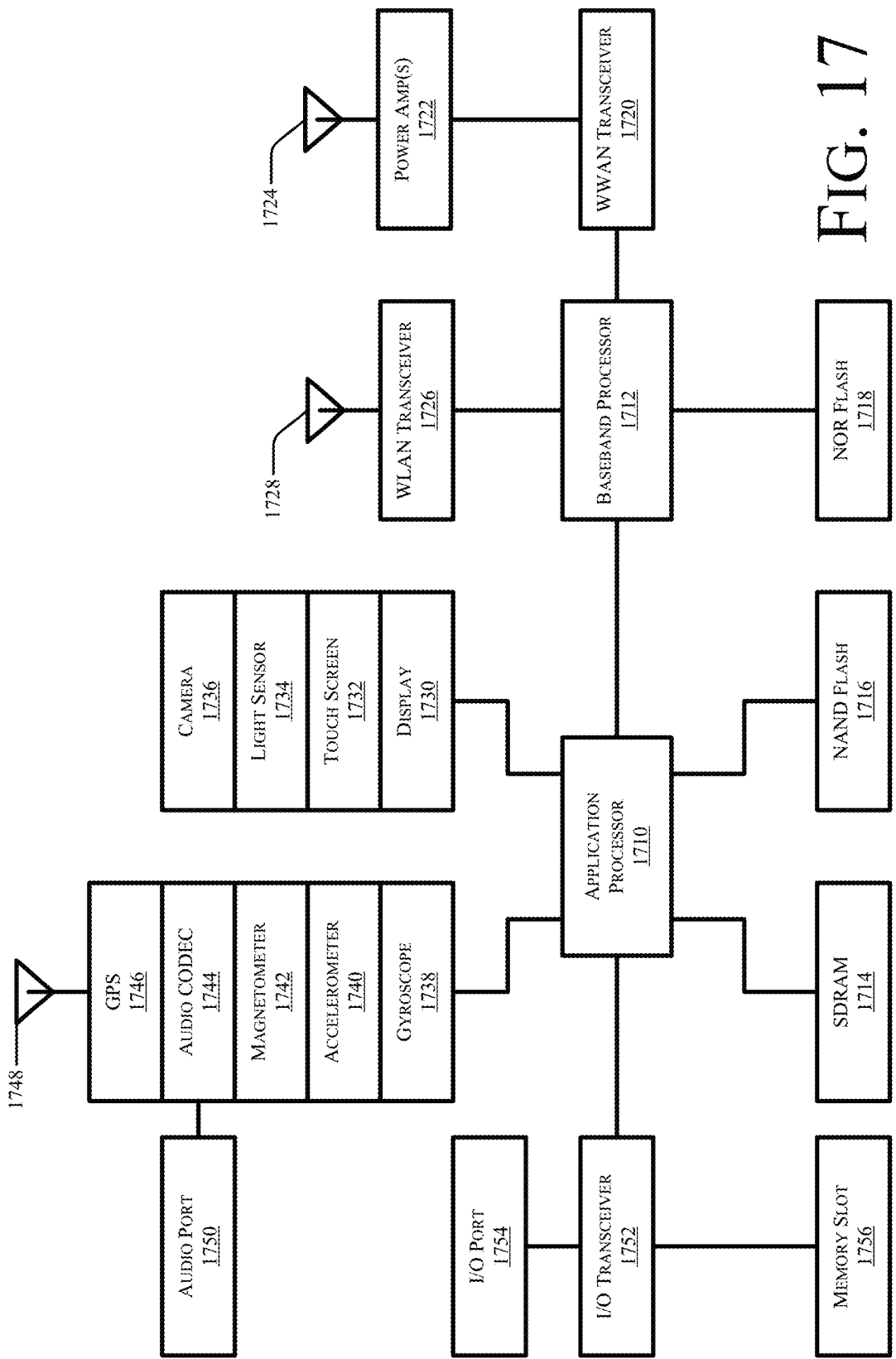
FIG. 17 is a schematic, block diagram illustration of an information-handling system in accordance with one or more exemplary embodiments disclosed herein.

FIG. 17 depicts an exemplary functional block diagram of an information-handling system 1700 that is capable of implementing methods to identify victims and aggressors according to the subject matter disclosed herein. Information handling system 1700 of FIG. 17 may tangibly embody one or more of any of the exemplary devices, exemplary network elements and/or functional entities of the network as shown in and described herein. In one example, information-handling system 1700 may represent the components of a UE 111 or eNB 110, and/or a WLAN access point 120, with greater or fewer components depending on the hardware specifications of the particular device or network element. In another example, information-handling system may provide M2M-type device capability. In yet another exemplary embodiment, information-handling system 1700 is capable of providing an uplink-transmit-power control technique that reduces interference experienced at other wireless devices according to the subject matter disclosed herein. Although information-handling system 1700 represents one example of several types of computing platforms, information-handling system 1700 may include more or fewer elements and/or different arrangements of elements than shown in FIG. 17, and the scope of the claimed subject matter is not limited in these respects.

In one or more examples, information-handling system 1700 may comprise one or more applications processor 1710 and a baseband processor 1712. Applications processor 1710 may be utilized as a general purpose processor to run applications and the various subsystems for information handling system 1700, and to capable of providing an uplink-transmit-power control technique that reduces interference experienced at other wireless devices according to the subject matter disclosed herein. Applications processor 1710 may include a single core or alternatively may include multiple processing cores wherein one or more of the cores may comprise a digital signal processor or digital signal processing core. Furthermore, applications processor 1710 may include a graphics processor or coprocessor disposed on the same chip, or alternatively a graphics processor coupled to applications processor 1710 may comprise a separate, discrete graphics chip. Applications processor 1710 may include on-board memory, such as cache memory, and further may be coupled to external memory devices such as synchronous dynamic random access memory (SDRAM) 1714 for storing and/or executing applications, such as capable of providing an uplink-transmit-power control technique that reduces interference experienced at other wireless devices according to the subject matter disclosed herein. During operation, and NAND flash 1716 for storing applications and/or data even when information handling system 1700 is powered off.

In one example, a list of candidate nodes may be stored in SDRAM 1714 and/or NAND flash 1716. Further, applications processor 1710 may execute computer-readable instructions stored in SDRAM 1714 and/or NAND flash 1716 that result in an uplink-transmit-power control technique that reduces interference experienced at other wireless devices according to the subject matter disclosed herein.

In one example, baseband processor 1712 may control the broadband radio functions for information-handling system 1700. Baseband processor 1712 may store code for controlling such broadband radio functions in a NOR flash 1718. Baseband processor 1712 controls a wireless wide area network (WWAN) transceiver 1720 which is used for modulating and/or demodulating broadband network signals, for example, for communicating via a 3GPP LTE network or the like as discussed herein with respect to FIG. 17. The WWAN transceiver 1720 couples to one or more power amplifiers 1722 that are respectively coupled to one or more antennas 1724 for sending and receiving radio-frequency signals via the WWAN broadband network. The baseband processor 1712 also may control a wireless local area network (WLAN) transceiver 1726 coupled to one or more suitable antennas 1728 and that may be capable of communicating via a Bluetooth-based standard, an IEEE 802.11-based standard, an IEEE 802.16-based standard, an IEEE 802.18-based wireless network standard, a 3GPP-based protocol wireless network, a Third Generation Partnership Project Long Term Evolution (3GPP LTE) based wireless network standard, a 3GPP2 Air Interface Evolution (3GPP2 AIE) based wireless network standard, a 3GPP-LTE-Advanced-based wireless network, a UMTS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NFC-based) link, a WiGig-based network, a ZigBee-based network, or the like. It should be noted that these are merely exemplary implementations for applications processor 1710 and baseband processor 1712, and the scope of the claimed subject matter is not limited in these respects. For example, any one or more of SDRAM 1714, NAND flash 1716 and/or NOR flash 1718 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, applications processor 1710 may drive a display 1730 for displaying various information or data, and may further receive touch input from a user via a touch screen 1732, for example, via a finger or a stylus. In one exemplary embodiment, screen 1732 display a menu and/or options to a user that are selectable via a finger and/or a stylus for entering information into information-handling system 1700.

An ambient light sensor 1734 may be utilized to detect an amount of ambient light in which information-handling system 1700 is operating, for example, to control a brightness or contrast value for display 1730 as a function of the intensity of ambient light detected by ambient light sensor 1734. One or more cameras 1736 may be utilized to capture images that are processed by applications processor 1710 and/or at least temporarily stored in NAND flash 1716. Furthermore, applications processor may be coupled to a gyroscope 1738, accelerometer 1740, magnetometer 1742, audio coder/decoder (CODEC) 1744, and/or global positioning system (GPS) controller 1746 coupled to an appropriate GPS antenna 1748, for detection of various environmental properties including location, movement, and/or orientation of information-handling system 1700. Alternatively, controller 1746 may comprise a Global Navigation Satellite System (GNSS) controller. Audio CODEC 1744 may be coupled to one or more audio ports 1750 to provide microphone input and speaker outputs either via internal devices and/or via external devices coupled to information-handling system via the audio ports 1750, for example, via a headphone and microphone jack. In addition, applications processor 1710 may couple to one or more input/output (I/O) transceivers 1752 to couple to one or more I/O ports 1754 such as a universal serial bus (USB) port, a high-definition multimedia interface (HDMI) port, a serial port, and so on. Furthermore, one or more of the I/O transceivers 1752 may couple to one or more memory slots 1756 for optional removable memory, such as secure digital (SD) card or a subscriber identity module (SIM) card, although the scope of the claimed subject matter is not limited in these respects.

Figure 18:
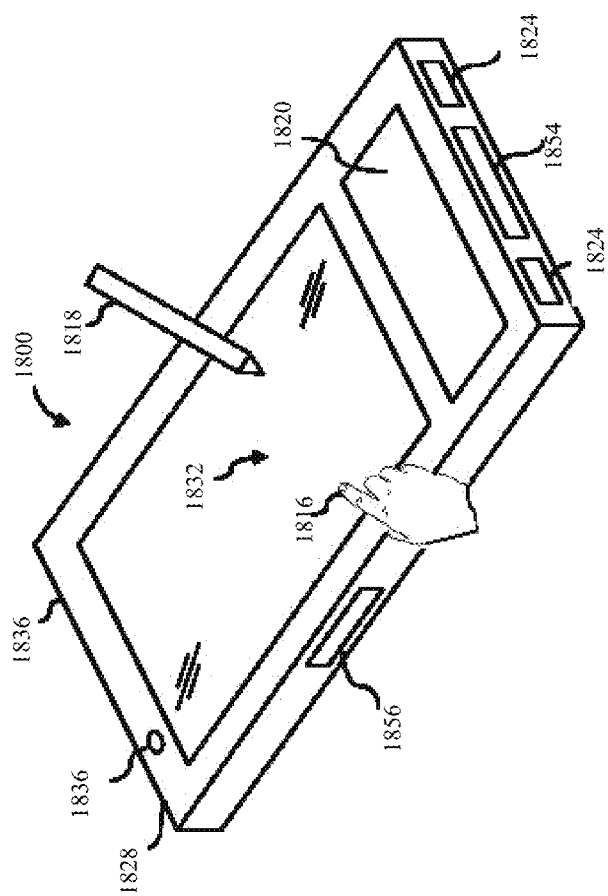
FIG. 18 is an isometric view of an exemplary embodiment of the information-handling system of FIG. 10 that optionally may include a touch screen in accordance with one or more embodiments disclosed herein.

FIG. 18 depicts an isometric view of an exemplary embodiment of the information-handling system of FIG. 17 that optionally may include a touch screen in accordance with one or more embodiments disclosed herein. FIG. 11 shows an example implementation of an information-handling system 1800 tangibly embodied as a cellular telephone, smartphone, smart-type device, or tablet-type device or the like, that is capable of implementing methods to identify victims and aggressors according to the subject matter disclosed herein. In one or more embodiments, the information-handling system a housing 1810 having a display 1030 that may include a touch screen 1032 for receiving tactile input control and commands via a finger 1816 of a user and/or a via stylus 1818 to control one or more applications processors 1710. The housing 1810 may house one or more components of information-handling system 1000, for example, one or more applications processors 1710, one or more of SDRAM 1714, NAND flash 1716, NOR flash 1718, baseband processor 1712, and/or WWAN transceiver 1720. The information-handling system 1800 further may optionally include a physical actuator area 1820 which may comprise a keyboard or buttons for controlling information-handling system 1000 via one or more buttons or switches. The information-handling system 1000 may also include a memory port or slot 1056 for receiving non-volatile memory, such as flash memory, for example, in the form of a secure digital (SD) card or a subscriber identity module (SIM) card. Optionally, the information-handling system 1000 may further include one or more speakers and/or microphones 1824 and a connection port 1854 for connecting the information-handling system 1800 to another electronic device, dock, display, battery charger, and so on. Additionally, information-handling system 1800 may include a headphone or speaker jack 1828 and one or more cameras 1836 on one or more sides of the housing 1810. It should be noted that the information-handling system 1800 of FIG. 18 may include more or fewer elements than shown, in various arrangements, and the scope of the claimed subject matter is not limited in this respect.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 19:
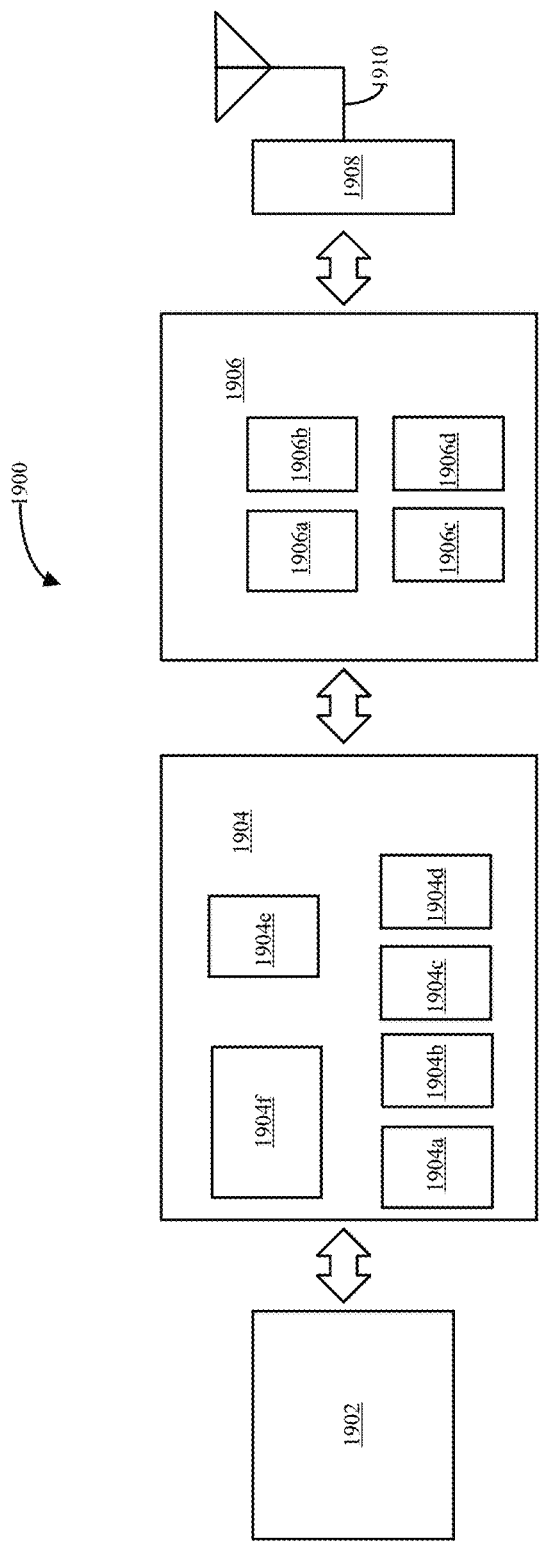
FIG. 19 is a schematic, block diagram illustration of components of a wireless device in accordance with one or more exemplary embodiments disclosed herein.

Embodiments described herein may be implemented into a system using any suitably configured hardware and/or software. FIG. 19 illustrates, for one embodiment, example components of a User Equipment (UE) device 1900. In some embodiments, the UE device 1900 may include application circuitry 1902, baseband circuitry 1904, Radio Frequency (RF) circuitry 1906, front-end module (FEM) circuitry 1908 and one or more antennas 1910, coupled together at least as shown.

The application circuitry 1902 may include one or more application processors. For example, the application circuitry 1902 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1904 may include circuitry such as, but not limited to, one or more single-core or multi-core processors. The baseband circuitry 1904 may include one or more baseband processors and/or control logic to process baseband signals received from a receive signal path of the RF circuitry 1906 and to generate baseband signals for a transmit signal path of the RF circuitry 1906. Baseband processing circuitry 1904 may interface with the application circuitry 1902 for generation and processing of the baseband signals and for controlling operations of the RF circuitry 1906. For example, in some embodiments, the baseband circuitry 1904 may include a second generation (2G) baseband processor 1904*a*, third generation (3G) baseband processor 1904*b*, fourth generation (4G) baseband processor 1904*c*, and/or other baseband processor(s) 1904*d* for other existing generations, generations in development or to be developed in the future (e.g., fifth generation (5G), 6G, etc.). The baseband circuitry 1904 (e.g., one or more of baseband processors 1904*a-d*) may handle various radio control functions that enable communication with one or more radio networks via the RF circuitry 1906. The radio control functions may include, but are not limited to, signal modulation/demodulation, encoding/decoding, radio frequency shifting, etc. In some embodiments, modulation/demodulation circuitry of the baseband circuitry 1904 may include Fast-Fourier Transform (FFT), precoding, and/or constellation mapping/demapping functionality. In some embodiments, encoding/decoding circuitry of the baseband circuitry 1904 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1904 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1904*e* of the baseband circuitry 1904 may be configured to run elements of the protocol stack for signaling of the PHY, MAC, RLC, PDCP and/or RRC layers. In some embodiments, the baseband circuitry may include one or more audio digital signal processor(s) (DSP) 1904*f*. The audio DSP(s) 1904*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1904 and the application circuitry 1902 may be implemented together such as, for example, on a system on a chip (SOC).

In some embodiments, the baseband circuitry 1904 may provide for communication compatible with one or more radio technologies. For example, in some embodiments, the baseband circuitry 1904 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 1904 is configured to support radio communications of more than one wireless protocol may be referred to as multi-mode baseband circuitry.

RF circuitry 1906 may enable communication with wireless networks using modulated electromagnetic radiation through a non-solid medium. In various embodiments, the RF circuitry 1906 may include switches, filters, amplifiers, etc. to facilitate the communication with the wireless network. RF circuitry 1906 may include a receive signal path which may include circuitry to down-convert RF signals received from the FEM circuitry 1908 and provide baseband signals to the baseband circuitry 1904. RF circuitry 1906 may also include a transmit signal path which may include circuitry to up-convert baseband signals provided by the baseband circuitry 1904 and provide RF output signals to the FEM circuitry 1908 for transmission.

In some embodiments, the RF circuitry 1906 may include a receive signal path and a transmit signal path. The receive signal path of the RF circuitry 1906 may include mixer circuitry 1906a, amplifier circuitry 1906b and filter circuitry 1906c. The transmit signal path of the RF circuitry 1906 may include filter circuitry 1906c and mixer circuitry 1906a. RF circuitry 1906 may also include synthesizer circuitry 1906d for synthesizing a frequency for use by the mixer circuitry 1906a of the receive signal path and the transmit signal path. In some embodiments, the mixer circuitry 1906a of the receive signal path may be configured to down-convert RF signals received from the FEM circuitry 1908 based on the synthesized frequency provided by synthesizer circuitry 1906d. The amplifier circuitry 1906b may be configured to amplify the down-converted signals and the filter circuitry 1906c may be a low-pass filter (LPF) or band-pass filter (BPF) configured to remove unwanted signals from the down-converted signals to generate output baseband signals. Output baseband signals may be provided to the baseband circuitry 1904 for further processing. In some embodiments, the output baseband signals may be zero-frequency baseband signals, although this is not a requirement. In some embodiments, mixer circuitry 1906a of the receive signal path may comprise passive mixers, although the scope of the embodiments is not limited in this respect.

In some embodiments, the mixer circuitry 1906a of the transmit signal path may be configured to up-convert input baseband signals based on the synthesized frequency provided by the synthesizer circuitry 1906d to generate RF output signals for the FEM circuitry 1908. The baseband signals may be provided by the baseband circuitry 1904 and may be filtered by filter circuitry 1906c. The filter circuitry 1906c may include a low-pass filter (LPF), although the scope of the embodiments is not limited in this respect.

In some embodiments, the mixer circuitry 1906a of the receive signal path and the mixer circuitry 1906a of the transmit signal path may include two or more mixers and may be arranged for quadrature downconversion and/or upconversion respectively. In some embodiments, the mixer circuitry 1906a of the receive signal path and the mixer circuitry 1906a of the transmit signal path may include two or more mixers and may be arranged for image rejection (e.g., Hartley image rejection). In some embodiments, the mixer circuitry 1906a of the receive signal path and the mixer circuitry 1906a may be arranged for direct downconversion and/or direct upconversion, respectively. In some embodiments, the mixer circuitry 1906a of the receive signal path and the mixer circuitry 1906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1906 may include analog-to-digital converter (ADC) and digital-to-analog converter (DAC) circuitry and the baseband circuitry 1904 may include a digital baseband interface to communicate with the RF circuitry 1906.

In some dual-mode embodiments, a separate radio IC circuitry may be provided for processing signals for each spectrum, although the scope of the embodiments is not limited in this respect.

In some embodiments, the synthesizer circuitry 1906d may be a fractional-N synthesizer or a fractional N/N+1 synthesizer, although the scope of the embodiments is not limited in this respect as other types of frequency synthesizers may be suitable. For example, synthesizer circuitry 1906d may be a delta-sigma synthesizer, a frequency multiplier, or a synthesizer comprising a phase-locked loop with a frequency divider.

The synthesizer circuitry 1906d may be configured to synthesize an output frequency for use by the mixer circuitry 1906a of the RF circuitry 1906 based on a frequency input and a divider control input. In some embodiments, the synthesizer circuitry 1906d may be a fractional N/N+1 synthesizer.

In some embodiments, frequency input may be provided by a voltage controlled oscillator (VCO), although that is not a requirement. Divider control input may be provided by either the baseband circuitry 1904 or the applications processor 1902 depending on the desired output frequency. In some embodiments, a divider control input (e.g., N) may be determined from a look-up table based on a channel indicated by the applications processor 1902.

Synthesizer circuitry 1906d of the RF circuitry 1906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1906 may include an IQ/polar converter.

FEM circuitry 1908 may include a receive signal path which may include circuitry configured to operate on RF signals received from one or more antennas 1910, amplify the received signals and provide the amplified versions of the received signals to the RF circuitry 1906 for further processing. FEM circuitry 1908 may also include a transmit signal path which may include circuitry configured to amplify signals for transmission provided by the RF circuitry 1906 for transmission by one or more of the one or more antennas 1910.

In some embodiments, the FEM circuitry 1908 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1906). The transmit signal path of the FEM circuitry 1908 may include a power amplifier (PA) to amplify input RF signals (e.g., provided by RF circuitry 1906), and one or more filters to generate RF signals for subsequent transmission (e.g., by one or more of the one or more antennas 1910.

In some embodiments, the UE device 1900 may include additional elements such as, for example, memory/storage, display, camera, sensor, and/or input/output (I/O) interface.

The following pertains to further examples.

Example 1 is an apparatus of an eNB capable to manage a bearer in a network comprising multiple heterogeneous radio access technology network access points, the eNB comprising processing circuitry to determine a first portion of the bearer to be allocated to a first network access point and a second portion of the bearer to be allocated to a second network access point in the network and allocate the first portion of the bearer to the first network access point and the second portion of the bearer to the second network access point.

In Example 2, the subject matter of Example 1 can optionally include an arrangement in which the first network access point comprises the eNB and the second network access point comprises a wireless local area network (WLAN) access point.

In Example 3, the subject matter of any one of Examples 1-2 can optionally include an arrangement in which the eNB exchanges feedback information with the WLAN access point, wherein the feedback information comprises at least one of a WLAN load, a WLAN data, a number of users associated with the WLAN, an average access delay of WLAN, or an estimated backhaul delay.

In Example 4, the subject matter of any one of Examples 1-3 can optionally include processing circuitry to allocate the first portion of the bearer and the second portion of the bearer based at least in part on an allocation determined by one or more of the following criteria minimizing a sum of logarithms of delays across multiple bearers across multiple radio links managed by the eNB, minimizing a sum of delay differences across multiple bearers across multiple radio links managed by the eNB, minimizing a sum of the logarithms of delay differences across multiple bearers across multiple radio links managed by the eNB or minimizing a maximum of delay differences across multiple bearers across multiple radio links managed by the eNB.

In Example 5, the subject matter of any one of Examples 1-4 can optionally include processing circuitry to allocate the first portion of the bearer and the second portion of the bearer based at least in part on a physical data rate of the 3GPP network access point, a throughput of the WLAN, and a backhaul delay.

In Example 6, the subject matter of any one of Examples 1-5 can optionally include processing circuitry to allocate the first portion of the bearer to the first network access point and the second portion of the bearer to the second network access point by implementing a water-filling optimization algorithm which determines a splitting ratio using the physical data rate of the 3GPP network access point and the throughput of the WLAN for a plurality of user equipment (UE).

In Example 7, the subject matter of any one of Examples 1-6 can optionally include processing circuitry to deactivate a bearer splitting function for a UE when the splitting ratio for a UE falls below a threshold.

In Example 8, the subject matter of any one of Examples 1-7 can optionally include an arrangement in which the first network access point comprises the eNB and the second network access point comprises a millimeter-wave access point.

Example 9 is a machine-readable medium comprising instructions which, when executed by a processor in a network entity capable to establish a communication connection with a user equipment (UE), configure the processor to determine a first proportion of the bearer to be allocated to a first network access point and a second portion of the bearer to be allocated to a second network access point in the network and allocate the first portion of the bearer to the first network access point and the second portion of the bearer to the second network access point.

In Example 10, the subject matter of Example 9 can optionally include an arrangement in which the first network access point comprises the eNB and the second network access point comprises a wireless local area network (WLAN) access point.

In Example 11, the subject matter of any one of Examples 9-10 can optionally include an arrangement in which the eNB exchanges feedback information with the WLAN access point, wherein the feedback information comprises at least one of a WLAN load, a WLAN data, a number of users associated with the WLAN, an average access delay of WLAN, or an estimated backhaul delay.

In Example 12, the subject matter of any one of Examples 9-11 can optionally include processing circuitry to allocate the first portion of the bearer and the second portion of the bearer based at least in part on an allocation determined by one or more of the following criteria minimizing a sum of logarithms of delays across multiple bearers across multiple radio links managed by the eNB, minimizing a sum of delay differences across multiple bearers across multiple radio links managed by the eNB, minimizing a sum of the logarithms of delay differences across multiple bearers across multiple radio links managed by the eNB or minimizing a maximum of delay differences across multiple bearers across multiple radio links managed by the eNB.

In Example 13, the subject matter of any one of Examples 9-12 can optionally include processing circuitry to allocate the first portion of the bearer and the second portion of the bearer based at least in part on a physical data rate of the 3GPP network access point, a throughput of the WLAN, and a backhaul delay.

In Example 14, the subject matter of any one of Examples 9-13 can optionally include processing circuitry to allocate the first portion of the bearer to the first network access point and the second portion of the bearer to the second network access point by implementing a water-filling optimization algorithm which determines a splitting ratio using the physical data rate of the 3GPP network access point and the throughput of the WLAN for a plurality of user equipment (UE).

In Example 15, the subject matter of any one of Examples 9-14 can optionally include processing circuitry to deactivate a bearer splitting function for a UE when the splitting ratio for a UE falls below a threshold.

In Example 16, the subject matter of any one of Examples 9-15 can optionally include an arrangement in which the first network access point comprises the eNB and the second network access point comprises a millimeter-wave access point.

Example 17 is an apparatus of a user equipment (UE) capable to establish a bearer with a communication network, the user equipment comprising processing circuitry to receive data from at least a first access point comprising an eNB and a second access point in a heterogeneous network, estimate at least one of a physical data rate of the eNB, a throughput on the second access point, and a backhaul delay on the second access point and transmit the at least one of a physical data rate of the eNB, a throughput on the second access point, and a backhaul delay on the second access point to the eNB.

In Example 18, the subject matter of Example 17 can optionally include processing circuitry to transmit the at least one of a physical data rate of the eNB, a throughput on the second access point, and a backhaul delay on the second access point to the eNB in an extension of a PDCP status report.

In Example 19, the subject matter of any one of Examples 17-18 can optionally include processing circuitry to transmit the at least one of a physical data rate of the eNB, a throughput on the second access point, and a backhaul delay on the second access point to the eNB in an extension of a PDCP status report.

In Example 20, the subject matter of any one of Examples 17-19 can optionally include processing circuitry to determine a first portion of the bearer to be allocated to a first network access point and a second portion of the bearer to be allocated to a second network access point in the network, allocate the first portion of the bearer to the first network access point and the second portion of the bearer to the second network access point and transmit the first portion and the second portion to the eNB.

Example 21 is a machine-readable medium comprising instructions which, when executed by a processor in a user equipment (UE) capable to establish a bearer with a communication network, configure the processor to receive data from at least a first access point comprising an eNB and a second access point in a heterogeneous network, estimate at least one of a physical data rate of the eNB, a throughput on the second access point, and a backhaul delay on the second access point and transmit the at least one of a physical data rate of the eNB, a throughput on the second access point, and a backhaul delay on the second access point to the eNB.

In Example 22, the subject matter of Example 21 can optionally include processing circuitry to transmit the at least one of a physical data rate of the eNB, a throughput on the second access point, and a backhaul delay on the second access point to the eNB in an extension of a PDCP status report.

In Example 23, the subject matter of any one of Examples 21-22 can optionally include processing circuitry to transmit the at least one of a physical data rate of the eNB, a throughput on the second access point, and a backhaul delay on the second access point to the eNB in an extension of a PDCP status report.

In Example 24, the subject matter of any one of Examples 21-23 can optionally include processing circuitry to determine a first portion of the bearer to be allocated to a first network access point and a second portion of the bearer to be allocated to a second network access point in the network, allocate the first portion of the bearer to the first network access point and the second portion of the bearer to the second network access point and transmit the first portion and the second portion to the eNB.

In various examples, the operations discussed herein may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein.

Reference in the specification to "one example" or "an example" means that a particular feature, structure, or characteristic described in connection with the example may be included in at least an implementation. The appearances of the phrase "in one example" in various places in the specification may or may not be all referring to the same example.

Also, in the description and claims, the terms "coupled" and "connected," along with their derivatives, may be used. In some examples, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although examples have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus of an eNB to manage a bearer in a network comprising multiple heterogeneous radio access technology network access points, the eNB comprising processing circuitry to:

determine a first portion of the bearer to be allocated to a first network access point and a second portion of the bearer to be allocated to a second network access point in the network, wherein the first network access point comprises the eNB and the second network access point comprises a wireless local area network (WLAN) access point;

allocate the first portion of the bearer to the first network access point and the second portion of the bearer to the second network access point;

allocate the first portion of the bearer and the second portion of the bearer based at least in part on an allocation determined by one or more of the following criteria:

minimizing a sum of logarithms of delays across multiple bearers across multiple radio links managed by the eNB;

minimizing a sum of delay differences across multiple bearers across multiple radio links managed by the eNB; and minimizing a sum of the logarithms of delay differences across multiple bearers across multiple radio links managed by the eNB; or minimizing a maximum of delay differences across multiple bearers across multiple radio links managed by the eNB.

2. The apparatus of claim 1, wherein the eNB exchanges feedback information with the WLAN access point, wherein the feedback information comprises at least one of a WLAN load, a WLAN data, a number of users associated with the WLAN, an average access delay of WLAN, or an estimated backhaul delay.

3. The apparatus of claim 1, further comprising processing circuitry to:

allocate the first portion of the bearer and the second portion of the bearer based at least in part on a physical data rate of the 3GPP network access point, a throughput of the WLAN, and a backhaul delay.

4. The apparatus of claim 3, further comprising logic to:

allocate the first portion of the bearer to the first network access point and the second portion of the bearer to the second network access point by implementing a water-filling optimization algorithm which determines a splitting ratio using the physical data rate of the 3GPP network access point and the throughput of the WLAN for a plurality of user equipment (UE).

5. The apparatus of claim 4, further comprising processing circuitry to deactivate a bearer splitting function for a UE when the splitting ratio for a UE falls below a threshold.

6. The apparatus of claim 1, wherein the first network access point comprises the eNB and the second network access point comprises a millimeter-wave access point.

7. A non-transitory machine-readable medium comprising instructions which, when executed by a processor in a network entity to establish a communication connection with a user equipment (UE), configure the processor to:

determine a first portion of the bearer to be allocated to a first network access point and a second portion of the bearer to be allocated to a second network access point in the network wherein the first network access point comprises the eNB and the second network access point comprises a wireless local area network (WLAN) access point;

allocate the first portion of the bearer to the first network access point and the second portion of the bearer to the second network access point;

allocate the first portion of the bearer and the second portion of the bearer based at least in part on an allocation determined by one or more of the following criteria:

minimizing a sum of logarithms of delays across multiple bearers across multiple radio links managed by the eNB;

minimizing a sum of delay differences across multiple bearers across multiple radio links managed by the eNB;

minimizing a sum of the logarithms of delay differences across multiple bearers across multiple radio links managed by the eNB; or minimizing a maximum of delay differences across multiple bearers across multiple radio links managed by the eNB.

8. The non-transitory machine-readable medium of claim 7, wherein the eNB exchanges feedback information, wherein the feedback information comprises at least one of a WLAN load, a WLAN data, a number of users associated with the WLAN, an average access delay of WLAN, or an estimated backhaul delay.

9. The non-transitory machine-readable medium of claim 7, further comprising instructions which, when executed by the processor, configure the processor to:

allocate the first portion of the bearer and the second portion of the bearer based at least in part on a physical data rate of the 3 GPP network access point, a throughput of the WLAN, and a backhaul delay.

10. The non-transitory machine-readable medium of claim 9, further comprising instructions which, when executed by the processor, configure the processor to:

allocate the first portion of the bearer to the first network access point and the second portion of the bearer to the second network access point by implementing a water-filling optimization algorithm which determines a splitting ratio using the physical data rate of the 3GPP network access point and the throughput of the WLAN for a plurality of user equipment (UE).

11. The non-transitory machine-readable medium of claim 10, further comprising instructions which, when executed by the processor, configure the processor to deactivate a bearer splitting function for a UE when the splitting ratio for a UE falls below a threshold.

12. The non-transitory machine-readable medium of claim 7, wherein the first network access point comprises the eNB and the second network access point comprises a millimeter-wave access point.

13. An apparatus of a user equipment (UE) to establish a bearer with a communication network, the user equipment comprising processing circuitry to:

receive data from at least a first access point comprising an eNB and a second access point in a heterogeneous network;

estimate at least one of a physical data rate of the eNB, a throughput on the second access point, and a backhaul delay on the second access point;

transmit the at least one of a physical data rate of the eNB, a throughput on the second access point, and a backhaul delay on the second access point to the eNB;

determine a first portion of the bearer to be allocated to a first network access point and a second portion of the bearer to be allocated to a second network access point in the network;

allocate the first portion of the bearer to the first network access point and the second portion of the bearer to the second network access point; and transmit the first portion and the second portion to the eNB.

14. The apparatus of claim 13, further comprising processing circuitry to:

transmit the at least one of a physical data rate of the eNB, a throughput on the second access point, and a backhaul delay on the second access point to the eNB in an extension of a packet data convergence protocol (PDCP) status report.

15. A non-transitory machine-readable medium comprising instructions which, when executed by a processor in a user equipment (UE) to establish a bearer with a communication network, configure the processor to:

receive data from at least a first access point comprising an eNB and a second access point in a heterogeneous network;

estimate at least one of a physical data rate of the eNB, a throughput on the second access point, and a backhaul delay on the second access point;

transmit the at least one of a physical data rate of the eNB, a throughput on the second access point, and a backhaul delay on the second access point to the eNB;

determine a first portion of the bearer to be allocated to a first network access point and a second portion of the bearer to be allocated to a second network access point in the network;

allocate the first portion of the bearer to the first network access point and the second portion of the bearer to the second network access point; and transmit the first portion and the second portion to the eNB.

16. The non-transitory machine-readable medium of claim 15, further comprising instructions which, when executed by the processor, configure the processor to:

transmit the at least one of a physical data rate of the eNB, a throughput on the second access point, and a backhaul delay on the second access point to the eNB in an extension of a packet data convergence protocol (PDCP) status report.

17. The non-transitory machine-readable medium of claim 15 further comprising instructions which, when executed by the processor, configure the processor to:

determine a first portion of the bearer to be allocated to a first network access point and a second portion of the bearer to be allocated to a second network access point in the network;

allocate the first portion of the bearer to the first network access point and the second portion of the bearer to the second network access point; and transmit the first portion and the second portion to the eNB.

* * * * *